United States Patent [19]

Daley

[11] Patent Number: 4,847,778

[45] Date of Patent: Jul. 11, 1989

[54] COMPUTERIZED SHEET METAL LAYOUT SYSTEM

[76] Inventor: Nile W. Daley, 111 Stouffer Ave., Hagerstown, Md. 21740

[21] Appl. No.: 91,960

[22] Filed: Sep. 1, 1987

[51] Int. Cl.⁴ .............................................. G06F 15/46
[52] U.S. Cl. .............................. 364/474.22; 364/189; 364/472; 364/512; 364/520
[58] Field of Search ............... 364/472, 474, 475, 189, 364/191, 512, 520

[56] References Cited

U.S. PATENT DOCUMENTS

| | | | |
|---|---|---|---|
| 3,477,322 | 11/1969 | Gerber et al. | 364/475 |
| 3,843,875 | 10/1974 | Goodstal et al. | 364/475 |
| 3,867,616 | 2/1975 | Korelitz et al. | 364/189 |
| 3,875,387 | 4/1975 | McFadden et al. | 364/475 |
| 3,927,948 | 12/1975 | Cox et al. | 364/419 |
| 4,152,765 | 5/1979 | Weber | 364/191 |
| 4,181,954 | 1/1980 | Rosenthal et al. | 364/191 |
| 4,551,810 | 11/1985 | Levine | 364/475 |
| 4,554,635 | 11/1985 | Levine | 364/475 |
| 4,754,404 | 6/1988 | Inoue | 364/475 |

Primary Examiner—A. D. Pellinen
Assistant Examiner—Jeffrey A. Gaffin
Attorney, Agent, or Firm—Leonard Bloom

[57] ABSTRACT

A compact, transportable computerized apparatus for designing sheet-metal fittings commonly used in the ductwork of ventilation systems. The apparatus is intended for use directly by sheet-metal workers at a job site. Designs for fittings are made one at a time with hardware and software that provide designs in real-time. The software includes coded instructions for real-time computing of patterns for boxes, elbows, transitions, and jumps. The software also includes coded instructions for computing elbows in the range of 0-90 angular degrees and for computing square throat radius elbows. The apparatus can be used with standard size metal sheets or with non-standard sheet metal scraps.

20 Claims, 12 Drawing Sheets

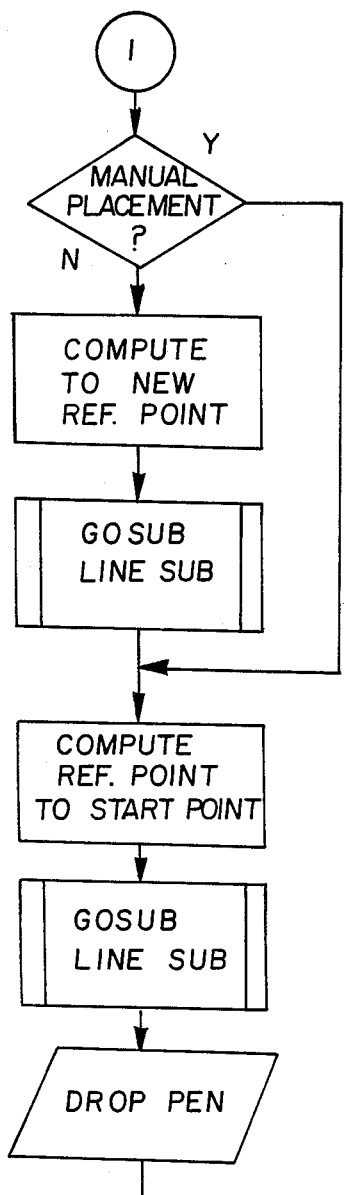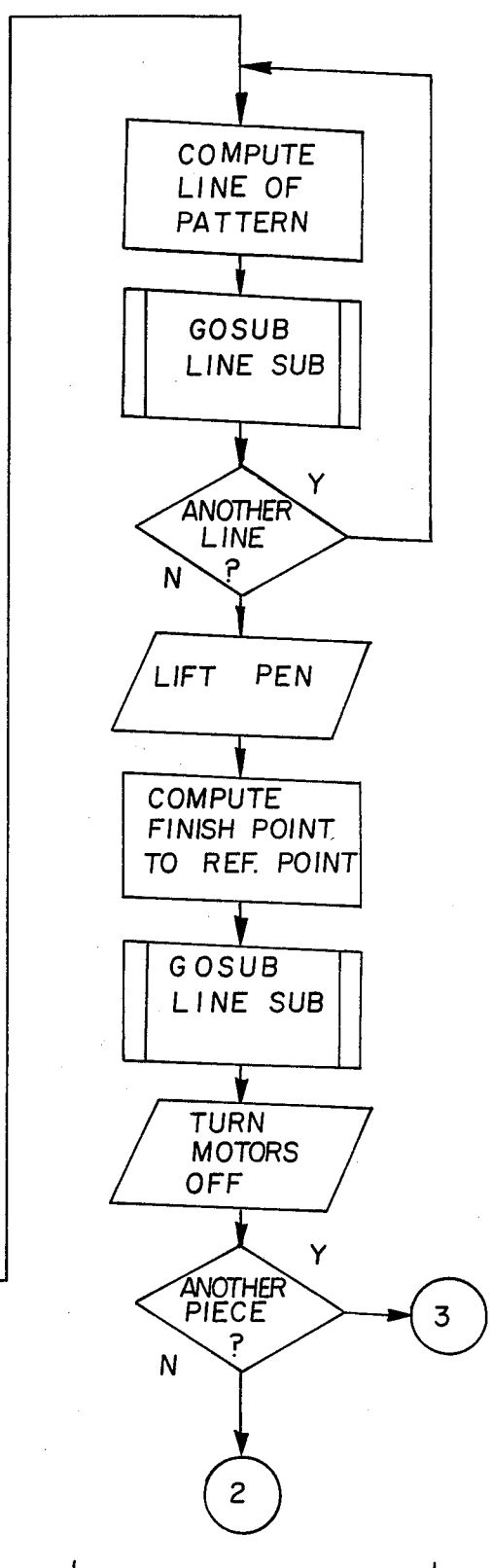
Fig. 9B

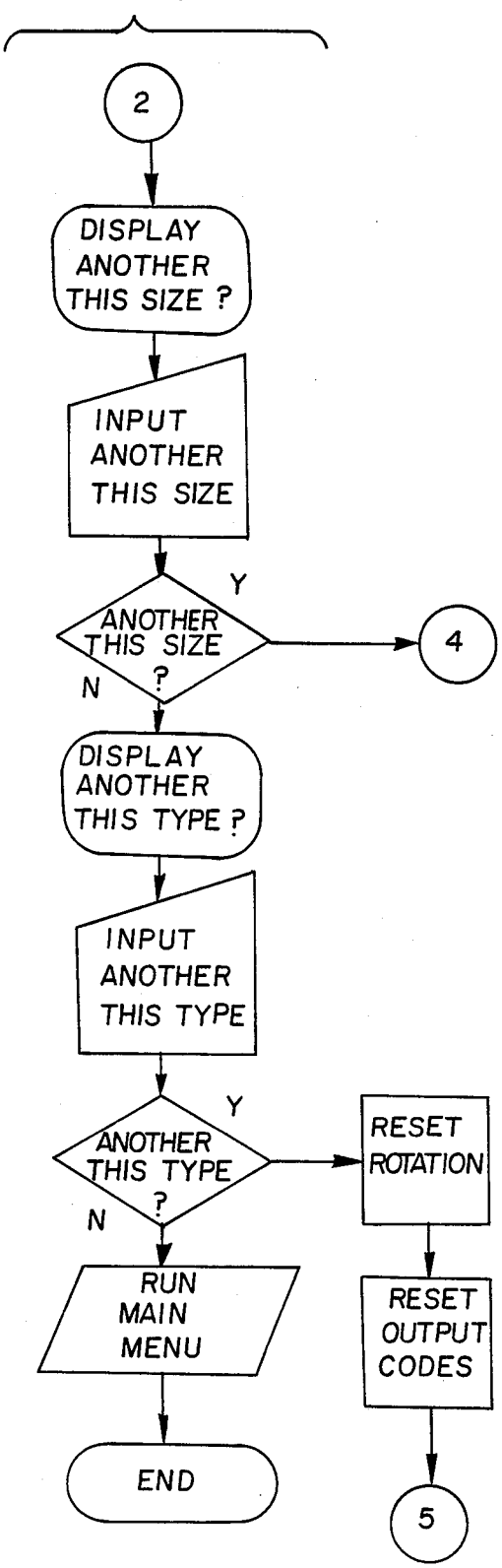
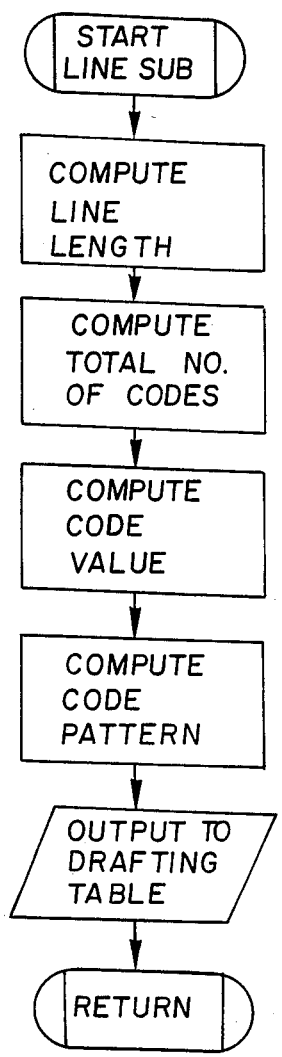
Fig. 9C

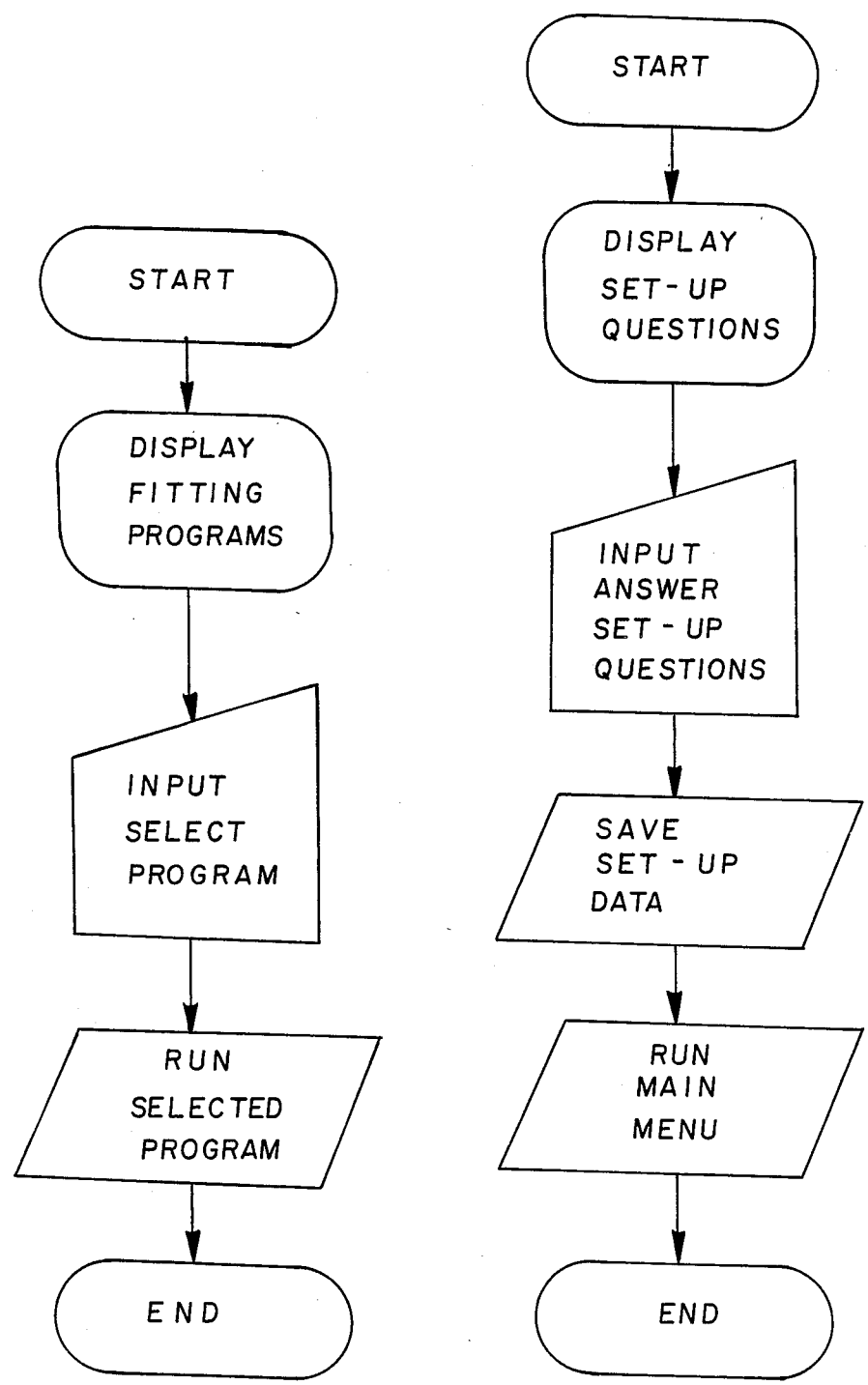

COMPUTERIZED SHEET METAL LAYOUT SYSTEM

FIELD OF THE INVENTION

The present invention relates to the field of metal fabrication, and more particularly, to a system for designing sheet metal fittings commonly used in the ductwork of ventilation systems.

BACKGROUND OF THE INVENTION

In the art of making ductwork for ventilation systems, special design challenges are presented because ducts are generally custom designed for each building in which they are installed. Ductwork includes long, straight three dimensional ducts and shorter three dimensional sheet metal fittings. Fittings are used when ducts change dimensions or direction. Each fitting includes a number of separate two dimensional sheet metal pieces that are cut from two dimensional sheet metal stock and then folded and/or edge-fitted together to form a three dimensional fitting.

In the prior art of which I am aware, U.S. Pat. Nos. 4,551,810 and 4,554,635 (issued to Levine) disclose computerized systems especially designed to aid in the production of customized ductwork by cutting patterns on two dimensional sheet stock, wherein the patterns are for two dimensional pieces that can be fit together to form three dimensional fittings and ducts.

Levine U.S. Pat. No. 4,551,810 notes that patterns for sheet metal pieces can be marked on a sheet of metal on an X-Y table. However, there is no disclosure that the method or apparatus is suitable for use at a job site or that the apparatus is small or compact enough to be contained in a truck or van and readily transported to and from a job site. On the contrary, the Levine method and apparatus is most definitely unsuitable for use at a job site for a number of reasons.

The Levine apparatus is relatively large and bulky, and large production runs are contemplated for use therewith. More specifically, the Levine method and apparatus is designed to layout all the sheet metal ductwork fittings for an entire building at one time. Large amounts of expensive off-line storage—one or more 80 megabyte hard disc drives—are required to store the data resulting from calculations for the fittings for the entire building. Furthermore, relatively long periods of time are required with the Levine device for computing the calculations for the entire building. Even more time is required for each change that is made in just one fitting; for example, a change in one fitting may cause the dimensions of many, many other fittings to be changed in the whole building. In addition, the Levine system is designed to operate primarily in a batch-wise operation and not in a real-time environment. In addition, the Levine apparatus would not, practically speaking, fit inside a truck or van for transport and use at a job site. Furthermore, the Levine device is designed to make patterns for more than one fitting simultaneously. This accounts, in part, for the complexity of the software and hardware necessary to implement the Levine system. On a job site, on the other hand, it would be desirable to provide for patterns for fittings, one at a time.

Because of the purpose for generating layout patterns for large numbers of sheet metal pieces for each computer run, Levine is primarily concerned with positioning the developed patterns in a series of groupings which yield a minimum surface area on stock sheet metal sheets so as to provide for optimum material usage and minimum material waste. Material waste concerns may be important when calculations are made for a whole building, and a production run for fittings is made for a whole building at a time. Digital data is generated to represent the optimum grouping, and the digital data representing the optimum grouping is supplied to an X-Y plotting table. The data is formatted in block format and includes digital data representing the starting point for each pattern in X-Y format and sequential digital data in X-Y format representing the contour of each pattern. Such complexities in data collection and transmission would not be needed if only one fitting pattern were calculated at a time.

Levine U.S. Pat. No. 4,554,635 is primarily directed to methods for creating ductwork pattern groupings in which the groupings are positioned so that all the patterns required for producing a final sheet metal fitting are aligned on a sheet material, such that they can be severed from the sheet material by a single, substantially-straight cut across the sheet material. The economy of cutting motions achieved by Pat. No. 4,554,635 may be desirable in large production runs where fittings are produced for an entire building for a run. However, such economies cannot be utilized at a job site where it is very desirable to be able to make one fitting at a time.

The Levine patents teach a computerized system for aiding a draftsman in designing and drafting a group of patterns for sheet metal pieces that economize in the use of materials. The user of the Levine apparatus is, therefore, contemplated as being a trained draftsman who generally works in the environment of a drafting office, and more particularly, an office equipped with computerized systems.

Levine makes use of standard size sheet metal pieces and optimizes pattern groups to minimize material waste. Levine makes no provision for utilizing waste material that is created in the process.

The requirements at a job site are vastly different from the requirements satisfied by the Levine method and apparatus. For example, at a job site there are generally three persons who work together to design and provide customized sheet metal fittings. First, a "take-off" man studies building blueprints and/or the building itself and arrives at a list of estimated customized ductwork fittings that are needed. The take-off man provides a layout man with the list of fittings, and the layout man then manually takes pieces of sheet metal stock and marks the appropriate pattern for each fitting on the sheet metal stock. Finally, a helper or the like cuts out the pieces according to the laid out pattern and folds the pieces and edge fits the pieces to form the fitting.

Performing the duties of the layout man requires a high degree of skill, and layout men are not in plentiful supply. As a matter of fact, there are relatively few capable layout in the work force. The layout man is generally not a trained draftsman, and his skills and job duties are distinctly different from that of a draftsman. The layout man works at a job site and must take the raw data supplied by the take-off man and then, by following complex mathematical formulas, make two dimensional patterns for pieces on two dimensional sheet metal stock that will result in a properly dimensioned three dimensional fitting when the pieces are fitted together.

Another desirable goal that the prior art does not satisfy is the need for a real-time pattern making at the job site. When a take-off man supplies the layout man with the dimensions of the customized fitting that is needed at a job site, it would be very uneconomical and impractical to have the calculations and patterns made away from the job site and have the fitting delivered to the job site. Too much time would be wasted while workers just waited for patterns or fittings to be delivered from an off site location.

The time wastage factor is very significant at the job site. The time factor far outweighs any small economies that might be obtained by optimizing pattern positioning of sheet metal stock to realize small savings in material when the pieces are cut out from the stock. Thus, the benefits of material wastage reduction that the Levine patents are directed toward achieving for a large building are virtually irrelevant at the job site. Because the Levine method and apparatus are for producing patterns for fittings for an entire building, and because, therefore, many patterns are produced in batch-wise fashion, slight savings in material for each pattern can be multiplied by a large number to result in considerable savings. However, for customized fittings to be created one at a time at a job site, no such considerable material savings can be obtained. On the contrary, at a job site, the time that would be wasted to make small savings in material would be much more costly than the small value of the material savings obtainable.

Although it is not practical to waste a lot of time at a job site to make small savings in material, it would be desirable to be able to make use of the scrap pieces of sheet metal so that they are not in fact wasted.

Aside from lacking efficiency and lacking practicality of sheet metal pattern making at a job site, the prior art does not provide for computerized pattern making for a number of specific fittings that are important in ductwork. For example, although the Levine patents provide for pattern making for radius throat, radius elbows, Levine does not provide pattern making for square throat, radius elbows. Furthermore, the prior art provides for making only 90 degree elbows. None of the prior art provides for making 0–90 degree radius elbows.

It would be desirable, therefore, to have a computerized pattern maker that can provide for elbows having an angular degree range all the way from 0–90 degrees.

Furthermore, none of the prior art provides a computerized pattern layout apparatus that lays out patterns for boxes, for plenums for diffuser boots, for two-piece radius elbows, sled boots, transitional 0–90 degree radius elbows, transitional 0–90 degree double radius elbows, transitional 0–90 degree radius tees, and transitional 0–90 degree double radius tees. It would, therefore, be desirable to have a computerized pattern maker that provides patterns for boxes for plenums, for diffuser boots, for two-piece radius elbows, sled boots, transitional 0–90 degree radius elbows, transitional 0–90 degree double radius elbows, transitional 0–90 degree radius tees, and transitional 0–90 degree double radius tees.

Other prior art references known to the applicant are as follows:

| Inventor(s) | Patent No. |
| --- | --- |
| Gerber et al | 3,477,322 |
| Goodstal et al | 3,843,875 |
| Korelitz et al | 3,867,616 |
| McFadden et al | 3,875,389 |
| Cox et al | 3,927,948 |
| Weber | 4,152,765 |
| Rosenthal et al | 4,181,954. |

SUMMARY OF THE INVENTION

Accordingly, it is a primary object of the present invention to provide a compact computerized system which marks sheet metal with an X-Y plotter to provide patterns for sheet metal pieces, and which is suitable for use at a job site by being small enough to be contained in a truck or van and transported to the job site.

It is another object of the invention to provide a computerized sheet metal pattern making apparatus that can be readily operated by a sheet metal layout man at a job site rather than by a trained draftsman at a fabricating facility or drafting office.

It is still another object of the invention to provide a computerized sheet metal pattern making apparatus that operates in a real-time environment.

It is yet still another object of the invention to provide a computerized sheet metal pattern making apparatus that does not require off-line storage for the calculated patterns.

It is a further object to provide a computerized sheet metal pattern making apparatus that does not waste time when changes in a sheet metal pattern are made.

It is a still further object to provide a computerized sheet metal pattern making apparatus that makes patterns for square throat radius elbows.

It is a yet still further object of the invention to provide a computerized pattern maker that can provide patterns for elbows having an angular degree range all the way from 0–90 degrees.

It is, again, another object of the invention to provide a computerized sheet metal pattern making apparatus that lays out the patterns of boxes for plenums or diffuser boots.

It is, again, yet another object of the invention to provide a computerized sheet metal pattern making apparatus that lays out a pattern for one fitting at a time.

It is yet still further object of the invention to provide a computerized pattern maker that can utilize scraps of metal that would otherwise be discarded.

In accordance with the invention, a transportable computerized system for real-time designing and marking patterns for the pieces of a sheet metal fitting on a standard size metal sheet or a scrap metal sheet is disclosed. The system includes a computer, a computer-controlled X-Y plotter, and software programs. The computer includes a user-controlled input device such as a keyboard, an internal memory, a processor, a monitor, and an output port. The keyboard is for real-time inputting data representing parameters in the pattern designs to be marked on the metal sheet.

The computer-controlled X-Y plotter is connected to the computer output port through an interface means. The plotter includes a surface for receiving the metal sheet and a means for marking the patterns on the metal sheet such as a felt tip pen. Preferably, the plotter has a hand-crank for manually moving the pen to a desired location on the metal sheet. Furthermore, the pen preferably has a manually operated, spring-biased mechanism which permits manual lowering of the pen onto the metal sheet to enable proper positioning of the pen, especially when a non-standard size metal sheet is being used.

The computer program is processed in real-time, and the program includes coded instructions for generating a menu on the monitor in real-time from which selections are inputted by the user using the keyboard. The program also includes coded instructions for computing patterns for a plurality of fittings in real-time. The program further includes coded instructions for permitting the user to select the fitting to be computed in real-time. In addition, the program includes coded instructions for utilizing the inputted data representing parameters in the pattern design to be marked on the metal sheet and for utilizing the coded instructions for computing patterns for a user-selected fitting in real-time. Further, the program includes coded instructions for controlling the operation of the computer-controlled X-Y plotter in real-time.

Preferably, the computer program further includes coded instructions for asking the user to input parameters with respect to an edge folding device for facilitating assembly of two dimensional cut pieces into a three dimensional fitting and input parameters with respect to a drive edge device for connecting plural fittings. Also, preferably, the computer program includes coded instructions for computing the patterns of boxes for plenums, elbows, transitions, and jumps in real-time.

In addition, the preferred computer program includes coded instructions for computing elbows in the range of 0-90 angular degrees and for computing square throat radius elbows.

Preferably, the real-time computerized sheet metal design and pattern making system of the invention is transportable in an automotive vehicle so that it can be transported and used at a job site.

By employing the principles of the present invention, numerous objects are realized and numerous benefits are obtained. For example, by employing the principles of the invention a compact computerized system is provided which marks sheet metal with an X-Y plotter to provide patterns for sheet metal pieces and which is suitable for use at a job site by being small enough to be contained in a truck or van and transported to the job site.

In addition, by following the teachings of the invention, a computerized sheet metal pattern making apparatus is provided that can be readily operated by a sheet metal layout man at a job site rather than by a trained draftsman at a fabricating facility or drafting office.

The apparatus of the invention does not require off-line storage for the calculated patterns. Furthermore, the apparatus of the invention does not waste time when changes in a sheet metal pattern are made. The invention provides computerized pattern making in a real-time environment. To further optimize time the computer can simultaneously plot a portion of a pattern on sheet metal stock while, at the same time, it computes an upcoming pattern portion that will be plotted next.

By employing the invention, a computerized sheet metal pattern making apparatus is provided that does not require off-line storage for the calculated patterns.

In accordance with the invention, a computerized sheet metal pattern making apparatus is provided that makes patterns for square throat radius elbows. Further in accordance with the invention, a computerized pattern maker is provided that can make patterns for elbows having an angular degree range all the way from 0-90 degrees.

Another benefit of the invention is the provision of a computerized sheet metal pattern making apparatus that lays out the patterns of boxes for plenums, and diffuser boots. Still another benefit of the invention is the provision of a computerized sheet metal pattern making apparatus that lays out the pattern of one fitting at a time and each piece of each fitting at a time.

By employing the principles of the invention, a computerized sheet metal pattern making apparatus is provided that is capable of using scraps of sheet metal that would otherwise be discarded.

These and other objects and advantages of the present invention will become apparent from a reading of the following specification, taken in conjunction with the enclosed drawings.

BRIEF DESCRIPTION OF THE DRAWINGS

FIG. 1A is a partial cross-sectional view taken along line 1A—1A showing the presence of small magnets located under the surface of the drafting area.

FIGS. 9A-9C are flow charts for a typical fitting program of the invention.

FIG. 10 is a flow chart for a set-up program to set up the system according to user selected parameters.

FIG. 11 is a flow chart for the main menu of the program used with the invention.

DETAILED DESCRIPTION OF THE PREFERRED EMBODIMENT

Figure 1:
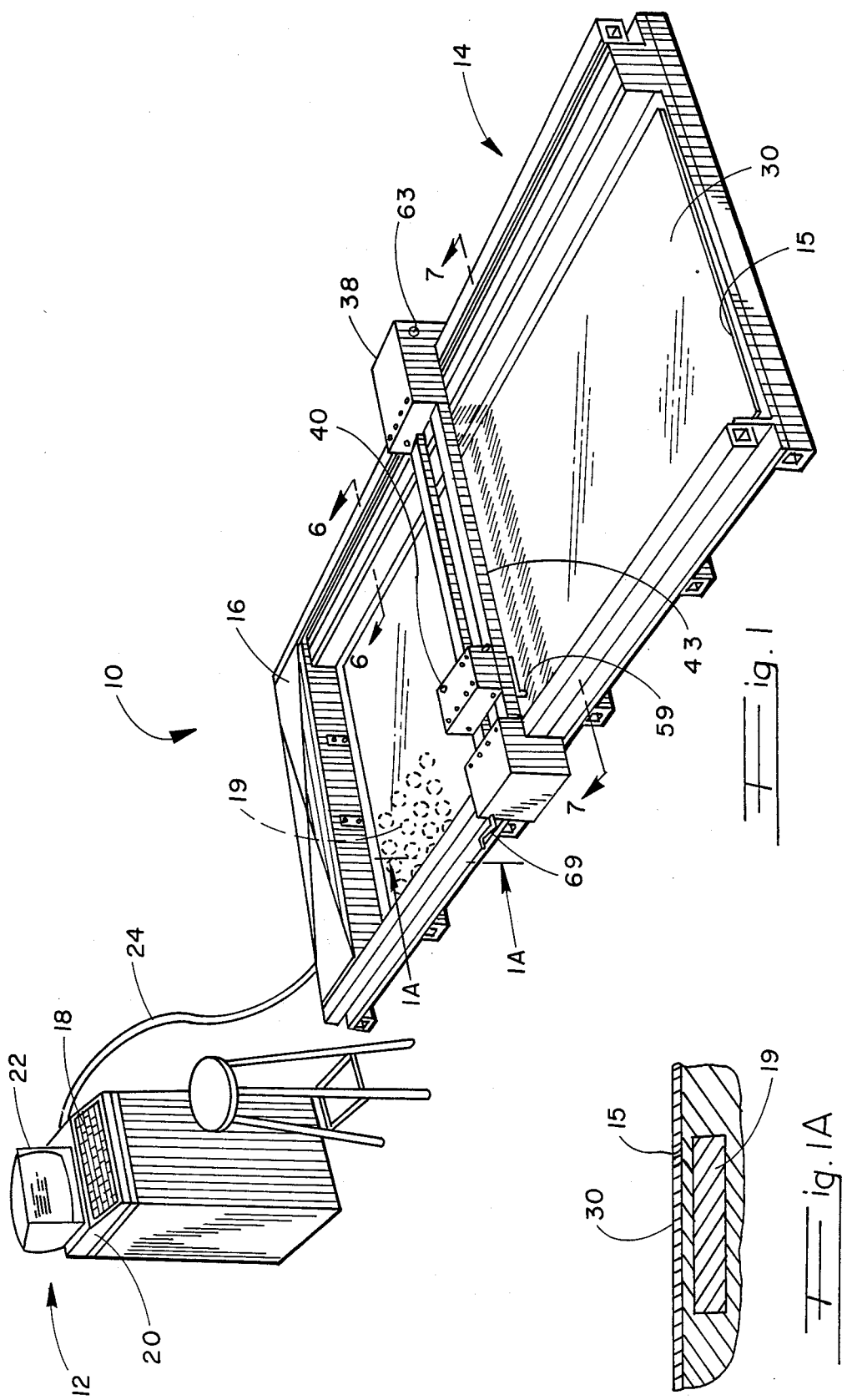
FIG. 1 is perspective view of the computerized system and apparatus of present invention for designing and pattern marking on metal sheets.

With reference to the drawings, more particularly FIG. 1, the computerized system 10 for designing and marking patterns for the pieces of sheet metal fitting on a metal sheet includes a computer 12, an electronic interface (shown schematically in FIG. 12 as reference element 13), an X-Y plotter 14, and a software program enabling the computer to control the plotter through the interface. The electronic interface circuitry can be housed in an electrical housing 16 located at one end of the plotter 14.

The X-Y plotter 14 has a surface 15 for receiving a metal sheet 30. The metal sheet 30 can be secured to the surface 15 by tape or by magnets 19 located under the surface of the drafting area. Magnets 19 are especially useful when the metal sheet 30 is a small piece of metal, such as a scrap piece, not occupying the entire surface 15 of the plotter.

The computer 12 generally includes a keyboard 18, a case 20 for the internal components, and a monitor 22. An electrical cable 24 connects the computer to the electrical interface.

In operation of the embodiment of the system of the invention shown in FIG. 1, the number of the fittings needed and the dimensions of the needed fittings are entered by the layout person into the computer 12 by way of a keyboard 18. The system calculates the length and position of each line segment of each piece of the fitting. As each line is calculated, that line data is sent from the computer's output port to electronics shown in FIGS. 12-14 which include a buffer board 52, a clock and logic board 54, and a driver board 56. The driver board 56 operates the motors 60-62 and pen solenoid 58 used to draw the pattern. By virtue of the buffer board 52, one line is being drawn as other lines are being calculated and sent to the buffer. This ability to draw and calculate simultaneously enables the system of the invention to use time more efficiently than a device that must wait for all calculations to be completed before any drawings are started.

The software for the development of the patterns is stored on a floppy diskette. The operator inserts the disk into the computer 12 turns on the computer. The computer boots up, and the main menu appears on the monitor 22. A suitable program to display the main menu is flowcharted in FIG. 11 and listed in Appendix "A".

For the first time that the diskette is used, the operator can choose a set up program. The set up program defines the edges of the interlocking edges of the pieces of the fitting and to determine whether the measurements will be in inches or in metric units. Alternatively the set up program can be on a separate diskette. The set up diskette is used to change data which is stored on the program diskette. Each system user can have his own separate set-up diskette for tailoring his program diskette for his specific shop requirements.

The interlocking edges relate to the edge-making machines that are used to form interlockable edges on flat metal pieces. More specifically, the operator defines the width of the Pittsburgh female edge and the Pittsburgh male edge. The width of the drive edge, the taper of the drive edge, and the box edge. Finally, the spacing between the pieces is set. After checking to make sure that all the information is correct, the program automatically returns to the main menu. A suitable set-up program is flowcharted in FIG. 10 and listed in Appendix "B".

Once the set up program information is entered, it need not be changed. However, if a change is needed, the set up program can be quickly recalled and the changes made.

After set up is complete and the main menu is displayed again, the operator selects the type of fitting for which a pattern will be made. For example, the operator chooses from among boxes, elbows, transitions, and jumps in the menu. A suitable general program for the typical fitting program is flowcharted in FIG. 9. A specific program listing for a 0-90 degree radius elbow is listed in Appendix "C". The general flowchart in FIG. 9 for a typical fitting is applicable to a wide range of specific fittings. For example, a specific program listing for an offset is provided in Appendix D.

Additional programs also conforming to the flowchart in FIG. 9 have been developed for the following fittings: two-piece radius elbows, double radius elbows, double radius offsets, square to rounds, sled boots, transitions, transitional 0-90 degree radius elbows, transitional 0-90 degree double radius elbows, transitional 0-90 degree radius tees, and transitional 0-90 degree double radius tees. For purposes of illustration, assuming that the operator selects an elbow, the program asks the operator questions that are easily understood by a competent layout person about elbow fittings. For an elbow, the program asks for the width of heel, width of cheek, depth of throat number one, and depth of throat number two, and the angle of the elbow (between 0 and 90 degrees). After checking the accuracy of the measurements inputted, the operator permits the program to calculate the pattern for the pieces. After calculating, the program displays length and width and the area of each piece that is needed for each piece of the fitting without operator assistance.

The program then asks the operator if the part should rotate 90 degrees. The dimensions of the area of the metal needed for the each piece will change as it is rotated. This helps the operator determine where and how the part will be drawn. The computer also tells the operator where to manually place the pen.

Figure 4:
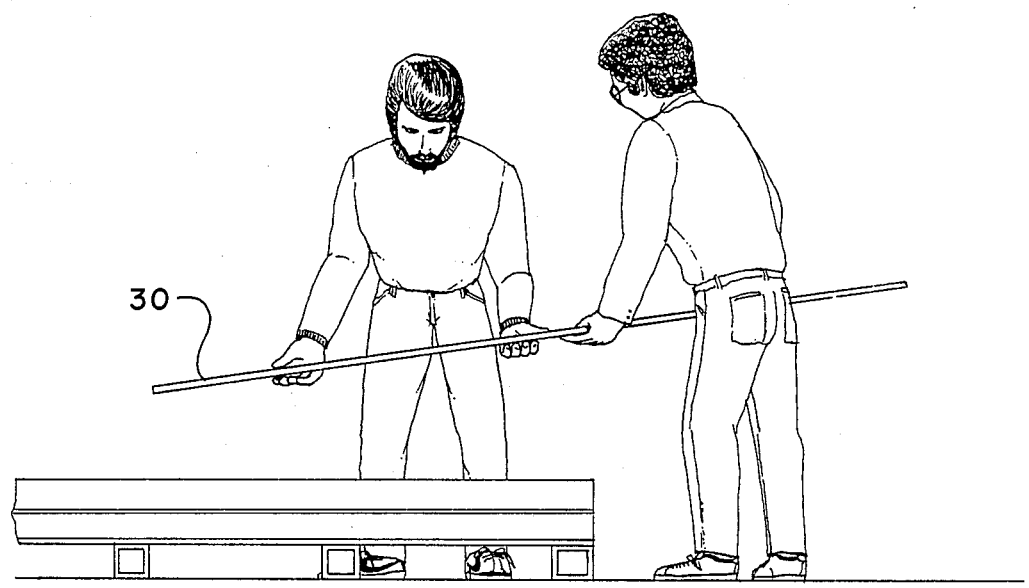
FIG. 4 shows personnel in the process of placing a metal sheet on the X-Y plotter of the invention.
Figure 7:
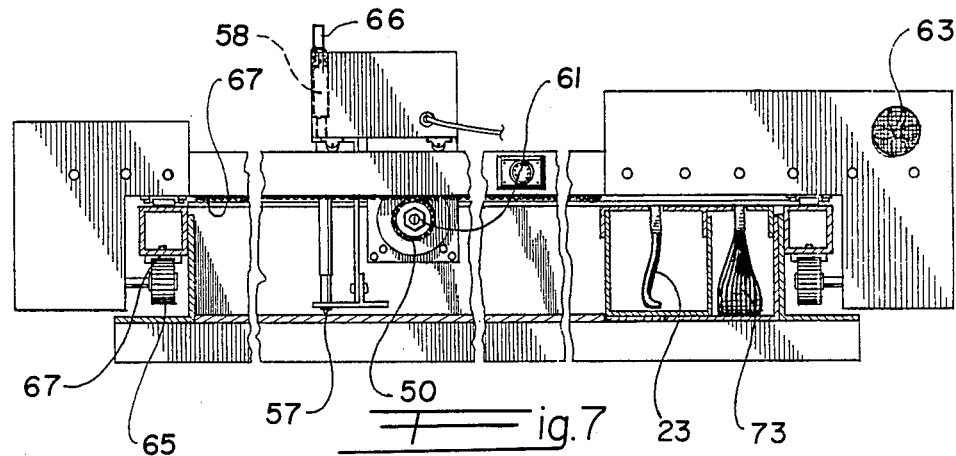
FIG. 7 is a cross-sectional view, taken along lines 7—7 of FIG. 1 and drawn to an enlarged scale, and showing the plotting surface including two parallel rails looking toward the first and second pen carriages.

As shown in FIG. 4, a flat metal sheet 30 is being placed in position in the X-Y plotter 14. As shown in FIG. 7, a pen placement button 66, located directly above the pen point 57 and spaced a distance therefrom, allows for accurate pen placement. By pushing the pen placement button 66, the operator can see the exact initial reference of the pen. When the operator pushes the pen placement button 66, he lowers the pen point overcoming the tendency of the pen solenoid to keep the pen point elevated when the pen drop coil is energized.

After the pen is positioned, the operator presses the appropriate key on the keyboard 18, and the computer calculates the data that is used to drive the X-Y plotter 14. Then the X-Y plotter 14 begins to trace the pattern 68 of the first piece on the metal sheet 30. Even though the X-Y plotter 14 is still drawing the pattern for the first piece, information can be entered and calculations performed on the second piece of the X-Y plotter 14 to be stored outside the computer's main memory thereby freeing the computer to proceed with inputting additional information and making additional calculations as the X-Y plotter 14 receives data from the buffer board 52. The program now asks if the second piece is to be rotated. After this question is answered, the program will ask for the placement of pattern of the new piece in relationship to the pattern of the last piece. At this point in the program, pen placement for the second piece can be done under computer control or done manually.

When the operator is ready to have the pattern for the second piece drawn by the X-Y plotter 14, the appropriate key on the keyboard is pressed, and the computer 12 calculates the data used to drive the X-Y plotter. Then the X-Y plotter begins to trace the pattern of the second piece on the metal sheet 30. Once again, even though the X-Y plotter is still drawing the second piece, information can be entered and calculations performed on the third piece.

This series of steps is repeated until all patterns for all pieces are drawn on the metal sheet 30. After all patterns for all pieces of a particular fitting are drawn, the computer 12 will ask if a duplicate of the fitting is needed. If not, the program will ask if another fitting of the same type is needed. If not, the program returns to the main menu.

With the invention, the operator has control of every step of the pattern marking. This is especially important for pieces of fittings that are made one at a time. The operator has the ability to place the pen anywhere on the drafting area and to check exact pen position by pressing the pen button 66.

Figure 2:
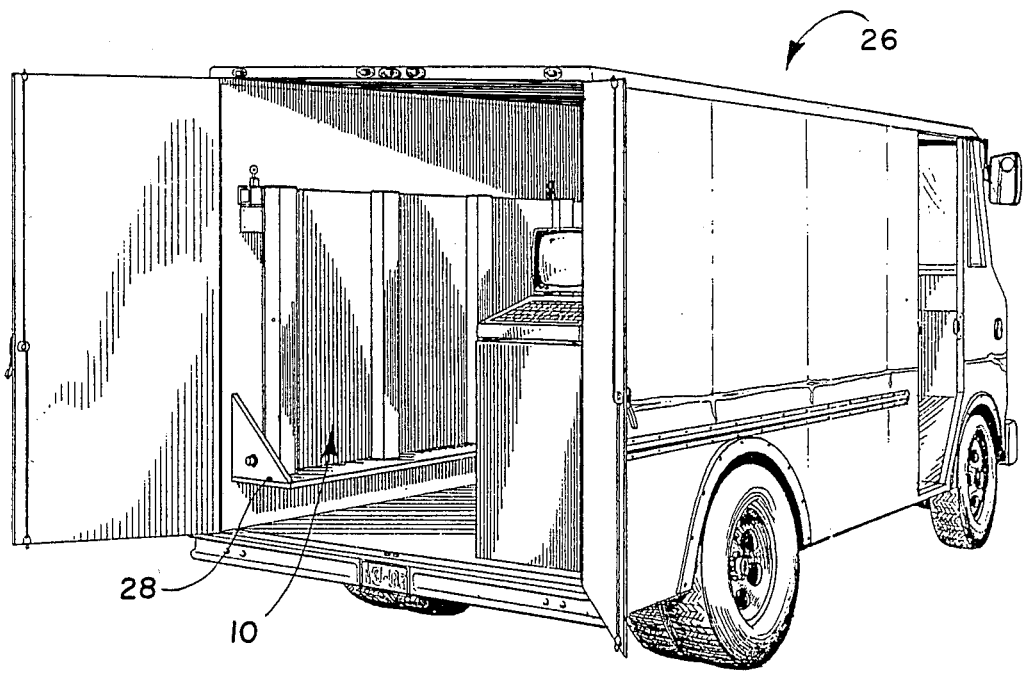
FIG. 2 illustrates how the embodiment of the invention (of FIG. 1) may be stored in a van for use at a job site.

As shown in FIG. 2, the entire system of the invention can be stored and transported in a van 26 to a job site. For convenience, the plotter 14 can be stored on a shelf 28 in the van, and can be stored vertically against the wall of the van as shown in FIG. 2.

Figure 3:
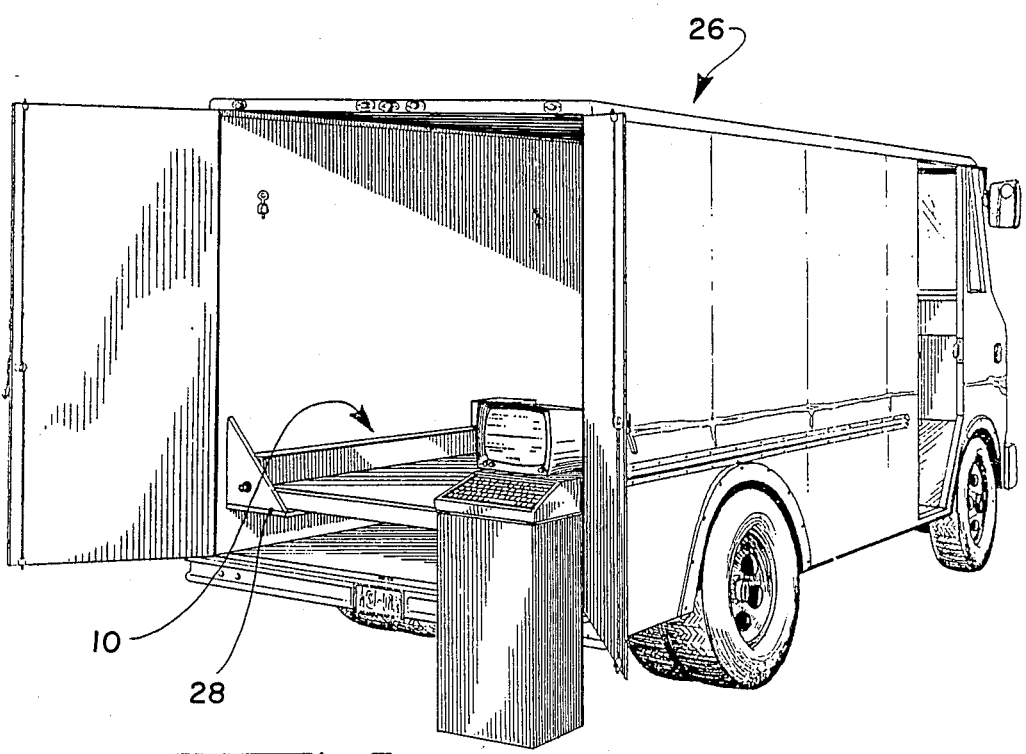
FIG. 3 illustrates how the embodiment shown in FIG. 2 may be made ready for operation.

As shown in FIG. 3, the plotter 14 has been lowered into the horizontal orientation for use at the job site. For convenience to the operator, the computer 12 can be taken out of the van 26 to allow the operator to use it more readily.

In FIG. 4, two workers are loading a metal sheet 30 onto the plotter 14. The metal sheet 30 would generally be a standard size that fits onto the working surface 15 of the plotter 14. However, with the invention, non-standard size pieces of metal can also be used. For example, a scrap of sheet metal can be secured to the surface 15 of the X-Y plotter 14 by magnets 19, and the pen 59 can be manually positioned at a suitable starting point on the scrap piece. Proper positioning of the pen point on the scrap piece is facilitated by use of manually operated, spring-return-biased pen placement button 66. The apparatus of the invention can then mark the scrap piece of metal with a predetermined pattern. Especially useful in proper positioning of the pen point on a scrap piece is the hand crank 69 (see FIGS. 1 and 5) which is used to manually position the first carriage 38 along the X direction.

Figure 5:
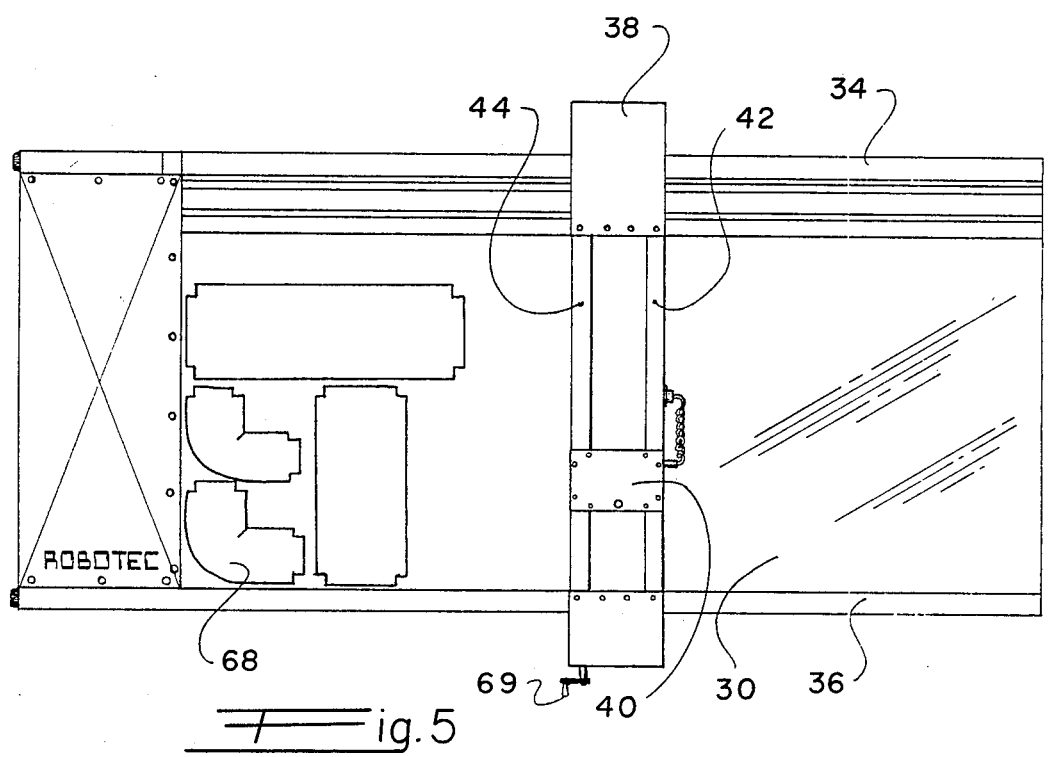
FIG. 5 is a top plan view of the X-Y plotter of FIG. 4, showing an X-Y grid in registration with the surface of the plotter.

In FIG. 5, the registration of an X-Y grid onto the working surface 32 of the plotter 14 is shown.

Figure 6:
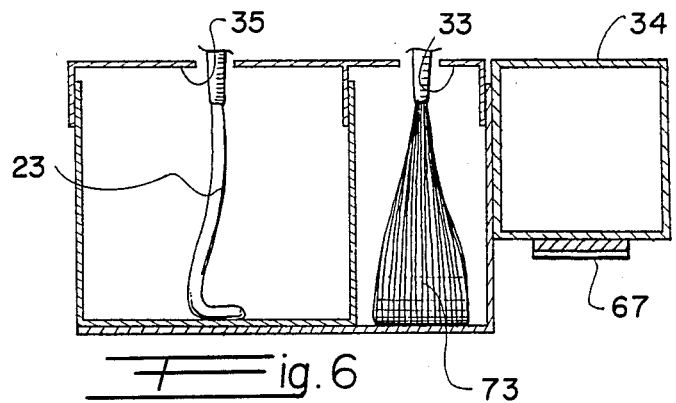
FIG. 6 is an enlarged, partial cross-sectional view of a first rail and two cable tracks, taken along the lines 6—6 of FIG. 1, and drawn to an enlarged scale.
Figure 8:
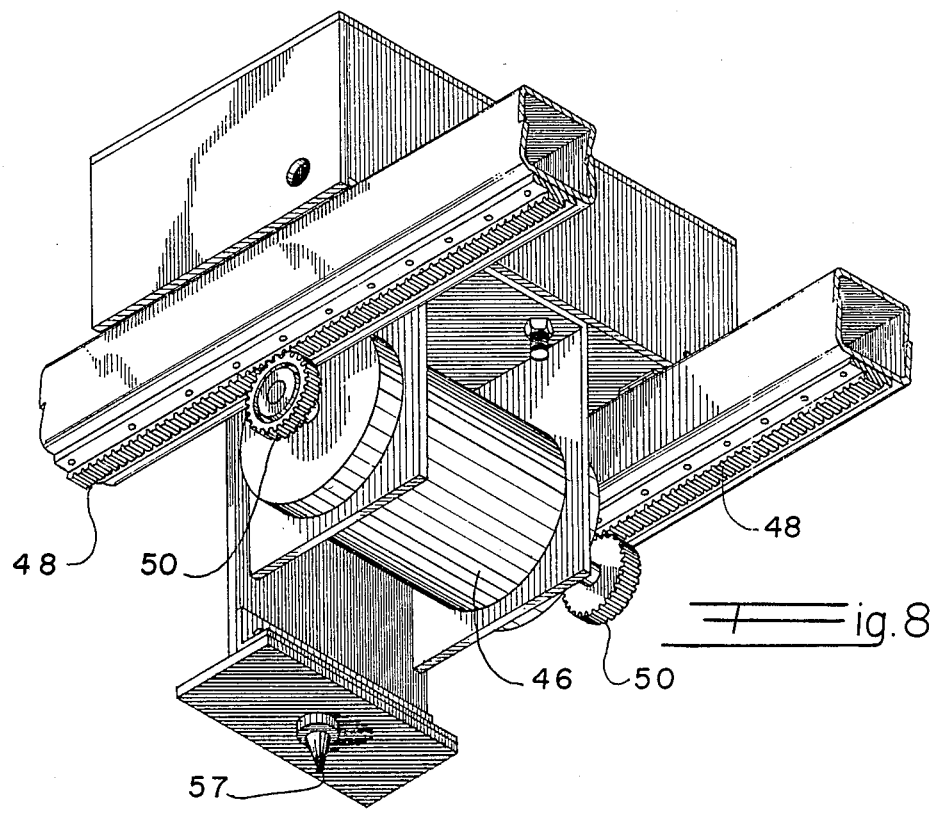
FIG. 8 is a bottom perspective view of the rack and pinion drive mechanism for the second carriage, which is supported by two parallel rails of the first carriage.

In FIGS. 6-8, some details of the plotter 14 are shown. In FIG. 6, a cross-section of the X rail 34 and electrical cable tracks 33 and 35 are shown.

FIGS. 5 and 7 show the first carriage 38 riding on X rails 34 and 36. A flexible cable connects the motors for the X rails with the electronic motor controls. The second carriage 40 rides on Y rails 42 and 44. A y drive motor 46 is used for driving the second carriage 40 in the Y direction on the Y rails 42 and 44. Another flexible cable connects the motor for the Y rails and the drive motor 46 for the Y rails.

FIG. 8 shows a close-up of the rack 48 and pinion 50 drive mechanism that is traversed by the motor 46 as it moves back and forth along the Y rails 42 and 44 as the second carriage 40 is moved back and forth in the Y direction.

Referring to FIGS. 5-8, the system of the invention is an open loop, contouring, numerically controlled, low resolution drafting machine with full floating zero and a drafting area of 4' by 8' to accommodate the standard size metal sheets 30 used in the sheet metal industry. The carriage assembly, powered by its attached stepping motor 46, holds the pen solenoid assembly 58 (see FIG. 7) and rolls up and down the Y-axis of the machine on two parallel "Y" rails. The drive is rack and pinion with a pinion gear 50 on each end of the motor and a rack 48 located on the underside of each of the Y rails. Using four rollers, one at the end of each of the two Y rails, the Y rails ride on the top of the two parallel X rails 34, 36.

The X axis motion is provided by two stepping motors 61, one mounted at each end of the first carriage. Both of the motors have a pinion gear 65 which meshes with the racks 67 located on the underside of the X rails. The X motors are electrically and mechanically synchronized.

FIGS. 9A-11 show flow charts for the software programs used for the embodiment of the system of the invention shown in FIG. 1.

Figure 9A:
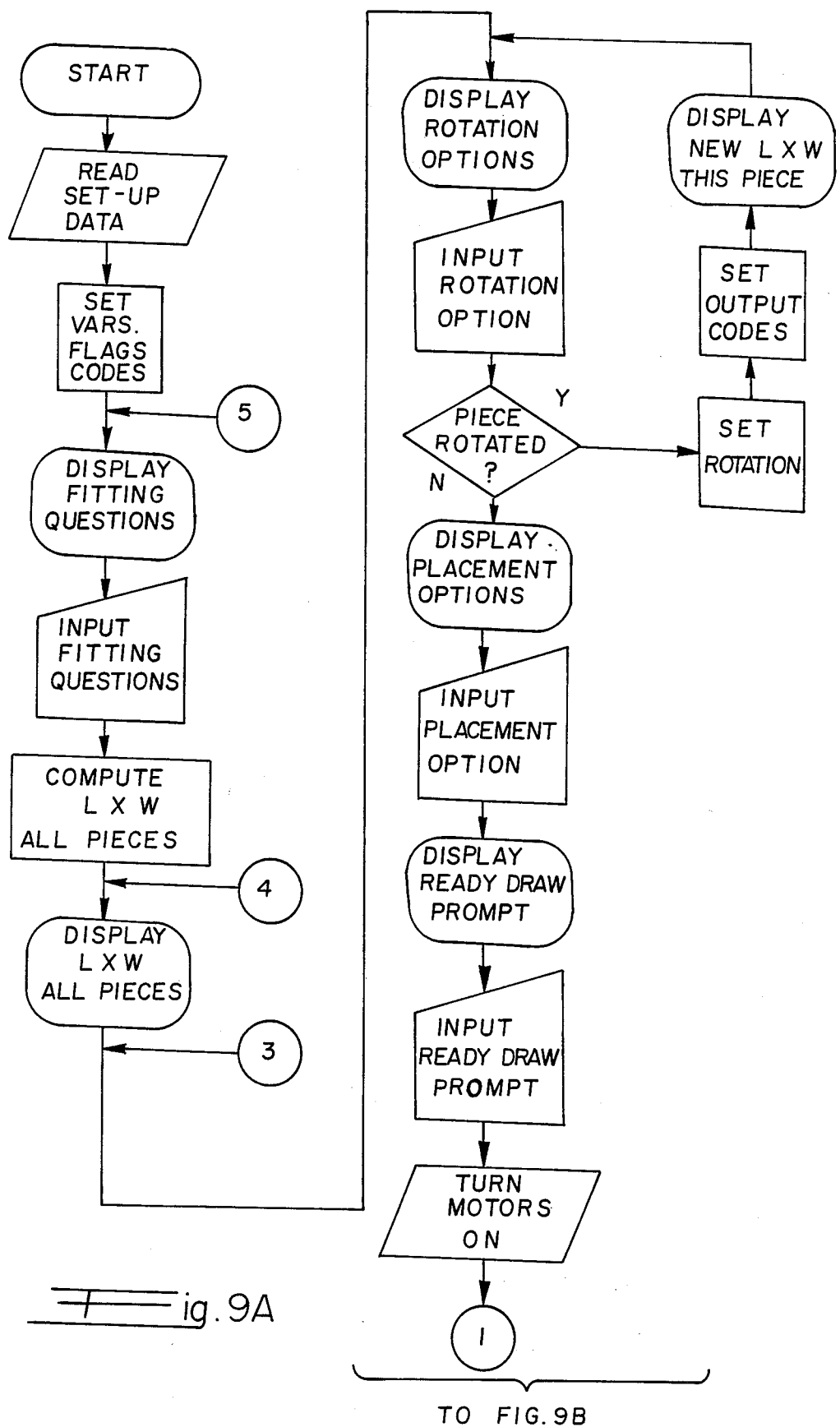

FIGS. 9A-9C show a typical pattern fitting portion of the programming. It is understood that each pattern has its own program for calculating the respective pattern. For example, there are separate programs for calculation of boxes, elbows, transitions, and offsets, respectively.

FIG. 10 shows a portion of the programming that is used for setting up or first using the program. In this portion of the programming, the operator enters data used by the fitting programs to determine the measurements of the Pittsburgh male, Pittsburgh female, drive edge, drive edge taper box edge, and, if the measurements are to be in inches or centimeters.

FIG. 11 is the flow chart for the operation of the man menu portion of the programming.

The controlling software is user friendly and allows almost anyone with some knowledge of heating and air condition duct to layout duct fitting in a fraction of the time it would normally take.

The software will ask what type of fitting the user wants to layout, then ask several questions about the size of that fitting. The software will then tell the user how much metal is needed for each piece. Positioning of the pen may be done manually or in a semi-automated manner through keyboard control. When under software control, the pen, a felt tip marker, is lifted and lowered by a solenoid mounted to a plate with four rollers attached to the bottom. The pen can also be lowered by pressing a button above the solenoid. This button physically pushes the pen down.

Information on such things as drive edges, drive edge tapers, box edges, Pittsburgh male - female widths, part spacing, and whether the measurements are in standard or metric are stored on the program disk with the aid of a set-up program which is also on this disk. The set-up program allows this information to be changed if necessary. This is done because although these values almost never change they may differ from shop to shop. They may also change do to an equipment change or a special job. By storing this information on the program disk there is no need for the operator to worry about it when he defines the size of a fitting.

At turn on a menu will appear on the monitor displaying all fitting types available on the diskette. The operator will chose from the menu which type of fitting he will work with.

Selecting the type of fitting and entering information on the sizes of the selected fitting is done by way of the keyboard. Placement and rotation may also be done a the keyboard.

A fitting is made from one or more patterns created on the sheet material. These patterns are made from line segments which are created by the program. The program mathematically calculates each of the line segments one at a time.

Each time a line segment is defined, the starting and end points are supplied to a sub-routine that supplies step information to the drafting table. This process allows the system to save operator time by calculating and creating the patterns in real-time. With the system's efficient use of time there is no need to waste time and money to store fitting data on disk, paper tape or other media.

After a fitting is defined all the pieces are listed on the monitor. The area needed for each piece or group of pieces are also given. At this time rotation of a piece or group of pieces is possible. Since all line segments are calculated in a standard position, rotation is accomplished by changing a set of variables in the subroutine that creates the step information for the drafting table.

The placement of the pieces on the sheet material can be done under software control or manually. If the manual option is selected then the program will tell the operator in which corner of the area to be used to place the pen. Pen placement is done by physically placing the pen over the desired point. The exact starting point may be checked by pressing the pen drop button located over the pen. Depressing this button will force the pen down and mark this reference point. The pen can also be moved to the new location under software control. The software can do this because it remembers the size, placement and rotation of the last piece or pieces and adds to this the part spacing information which was stored on the disk by the set-up program.

Any piece of a fitting may be skipped or repeated. This option is available because there is always the possibility that a piece of a fitting maybe damaged before the fitting is assembled.

After a fitting is completed the program will ask the operator if another fitting of the same type and size is needed. If so, then the program will start at the first piece of the fitting and skip the questions about the fitting size. If not then the program will ask if the same type of fitting of a different size is needed. If the answer is yes, then questions about the size of the fitting will appear. If not, then the main menu will reappear, displaying all the fitting types available on that diskette.

A program listing in the Basic Language for the flowcharts shown in FIGS. 9, 10 and 11 is provided as an Appendix which appears at the end of the specification.

Figure 12:
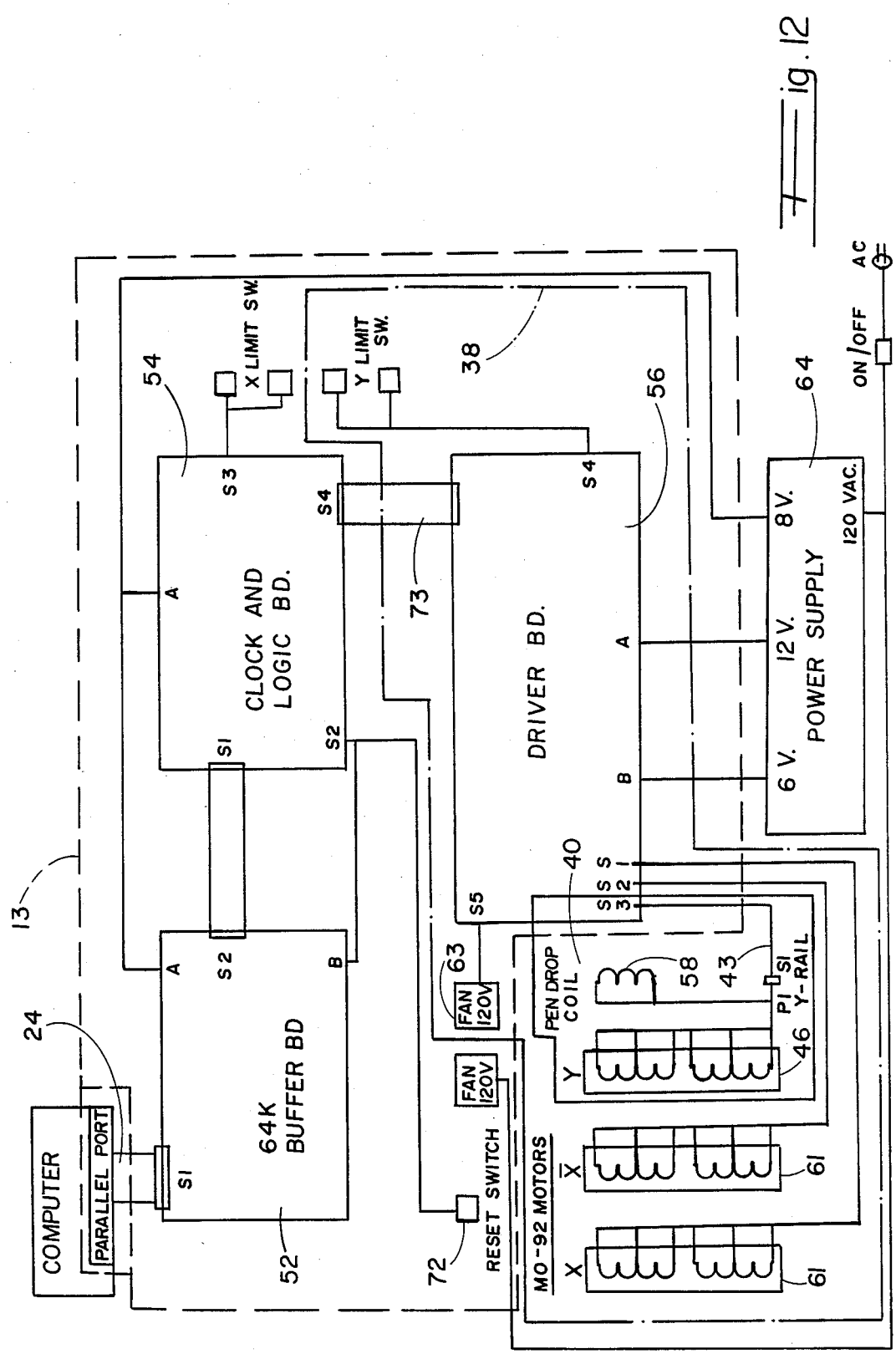
FIG. 12 is schematic diagram of the electrical hardware used in a preferred embodiment of the system of the invention.
Figure 13A:
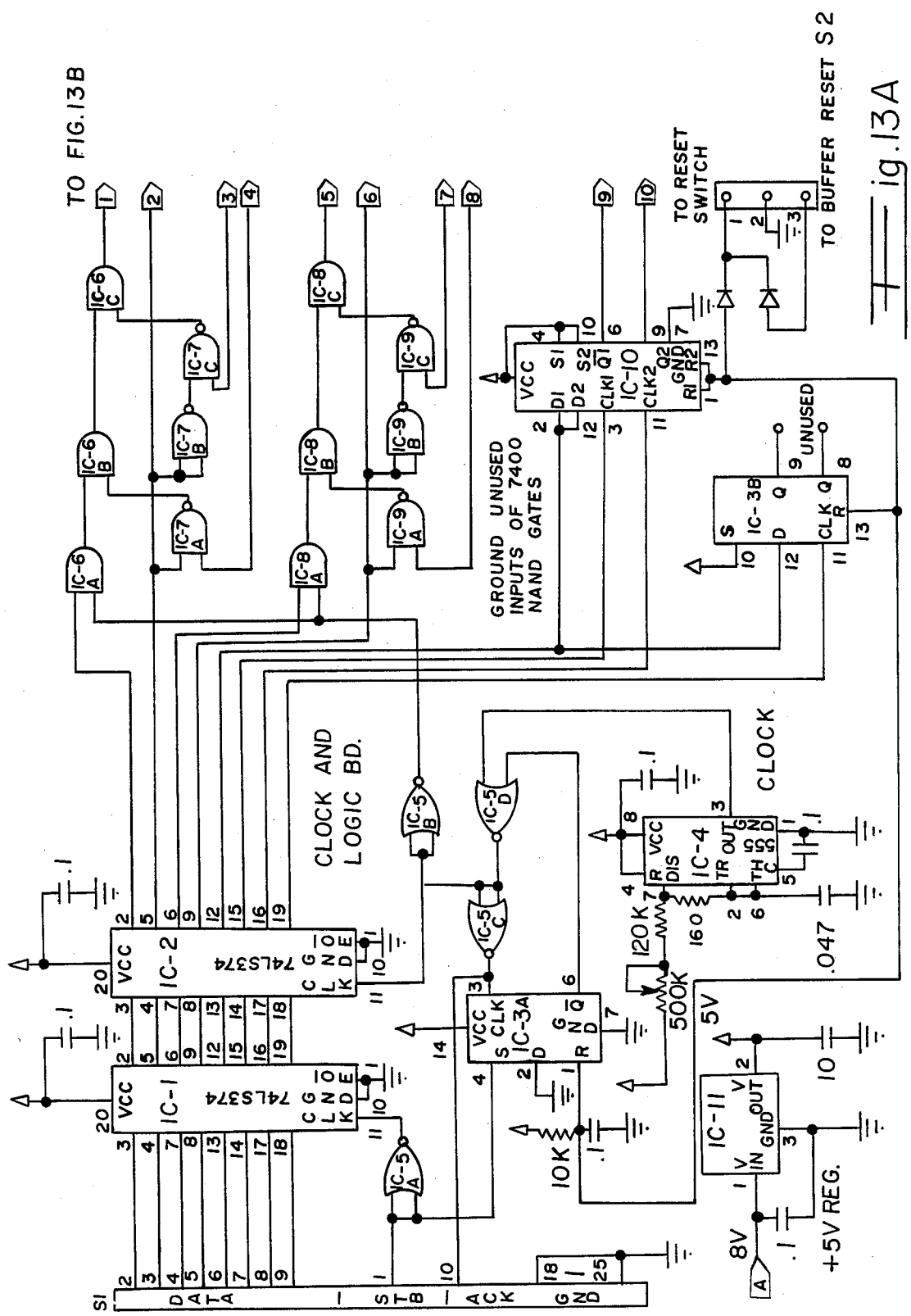
FIGS. 13A and 13B (taken together) are a schematic diagram for the clock and logic board used with the invention.
Figure 13B:
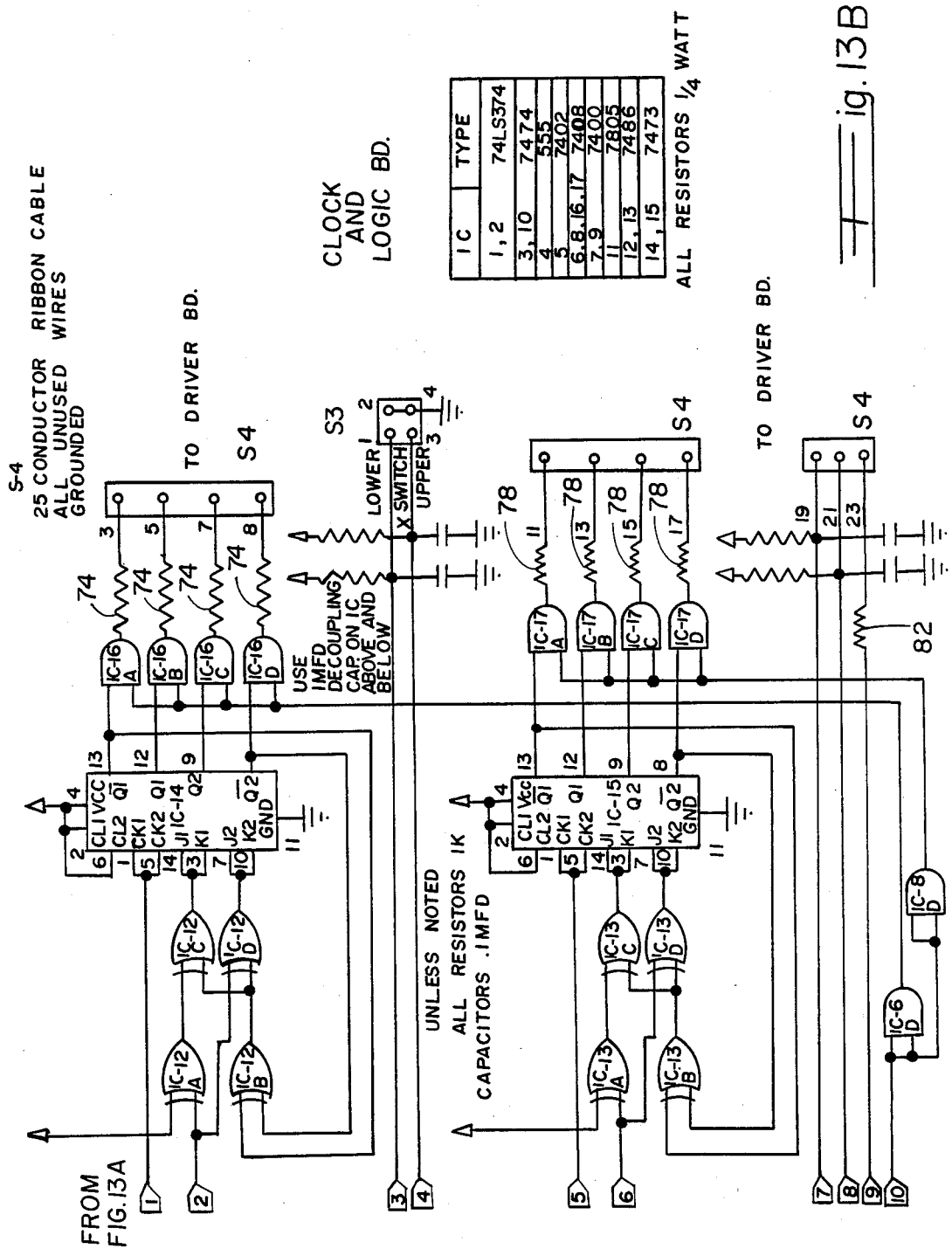
Figure 14:
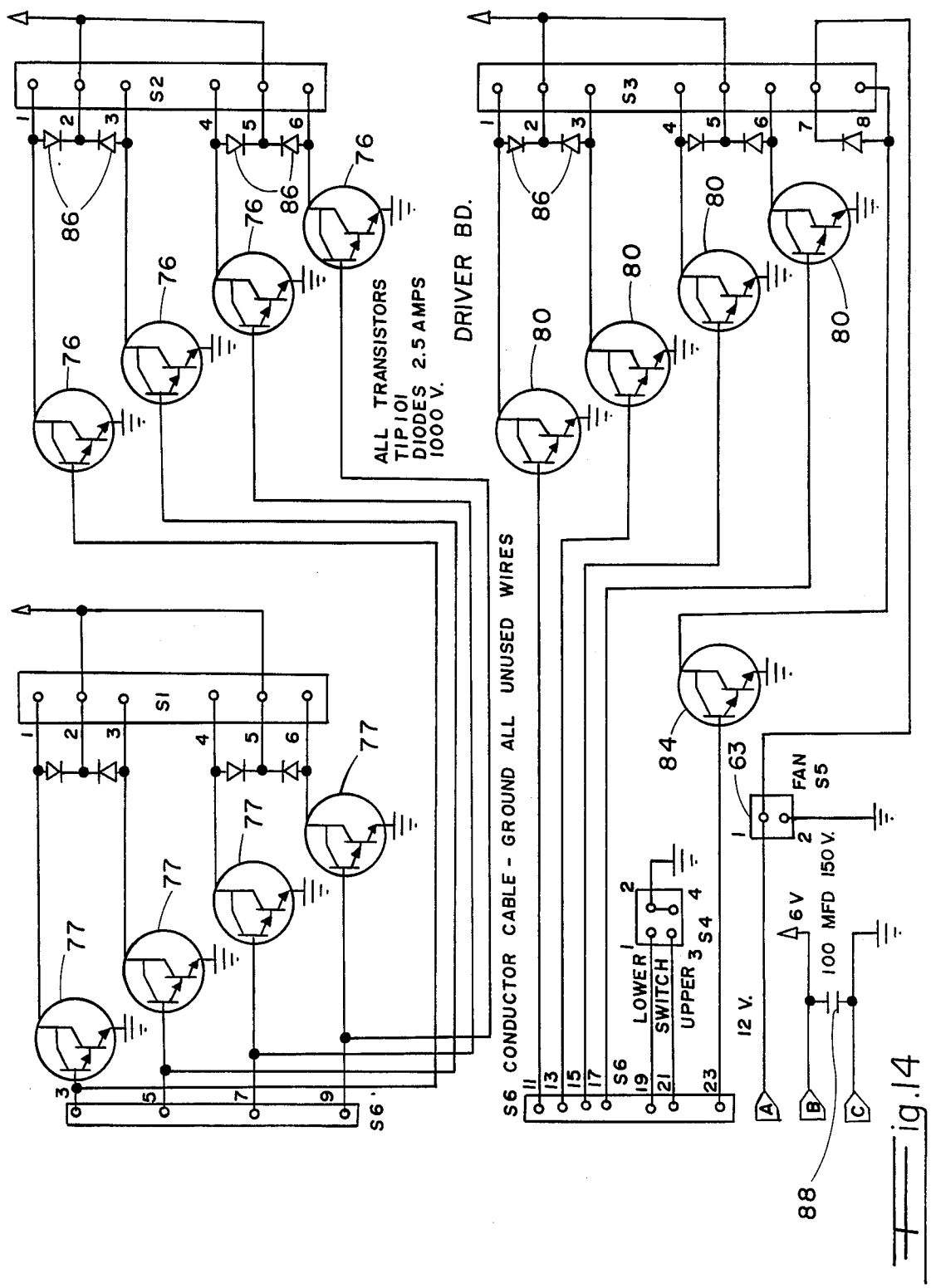
FIG. 14 is a schematic diagram for the driver board for driving the X-Y plotter used with the invention.

FIGS. 12–14 are electrical schematic diagrams for certain of the electrical hardware portions of the embodiment of the invention shown in FIG. 1.

In FIG. 12, the computer 12 is connected by electrical cable 24 to the electrical interface 13. The electrical interface 13 includes a buffer board 52, a clock and logic board 54, and a plotter driver board 56. The driver board 56 is connected to a pen drop coil 58 and three stepping motors 46, 61, and 61. A power supply 64 supplies D.C. power through cable 23 (see FIGS. 6 and 7) to the electrical circuit boards and to the stepping motors 46 and 61. Preferably, a fan 63 is used to cool the electronic components.

As shown in FIG. 12, long flexible ribbon cable 73 connects the clock and logic board 54 to the driver board 56. The clock and logic board 54 and other components outside of enclosed area 38 are stationary as the X-Y plotter operates. The enclosed area 38 includes components that move when the first carriage 38 moves. Within enclosed area 38 is a second enclosed area 40 which includes components that move when the second carriage 40 moves. Thus, flexible ribbon cable 73 connects the stationary electrical components to the first carriage 38. An additional cable 43 connects the first carriage 38 to the second carriage 40.

As shown in FIGS. 12–14, in the system of the invention, data is fed from the computer 12 into a conventional or suitable port such as a Centronics compatible port 70 of a buffer board such as the 64K buffer board 52 where it is stored until needed by the clock and logic board 54. A 32K or 128K buffer or other suitable buffer could also be used, if desired. The clock and logic board 54 accepts data from the buffer board 52, decodes it and sends it to the driver board 56 in the form of stepping logic. In the driver board 56 the stepping logic activates the power switching transistors which drive the stepping motors and pen coil.

The driver board 56 serves as an amplifier for the clock and logic board. If more motor speed would be needed, however, then the motor voltage could be increased by replacing Darlington transistors 76 and 77 with a chopper drive system. The chopper drive system steps up voltage from, for example, 5 to 30 volts. However, such an increase in voltage could be excessive for the stepping motors and cause them damage. Therefore, a chopper could be used with the invention to limit current to safe levels while at the same time maintaining the higher voltage.

The 64K buffer board 52 has a Centronics compatible parallel input and a parallel output 70 using a D-25 (or other suitable) output connector. The buffer can be cleared by pressing the reset button 72.

FIGS. 13A and 13B show greater detail in the electrical circuitry of the clock and logic board 54 shown in FIG. 12. FIGS. 13A and 13B are taken together to form the circuitry for clock and logic board 54. The connector posts "1–10" in FIG. 13A connect with the corresponding connector posts "1–10" in FIG. 13B.

The clock and logic board 54 processes data in the following manner:

The clock is IC-4, a 555 timer. With the help of the RC circuits across pins 7, 2 and 6, the IC provides a clock pulse out pin 3 with an adjustable frequency of between 50 Hz and 250 Hz.

The RC network connected to IC-3A pin 1 insures that, after power-up, pin 6 is High. This disables the clock at IC-5D. When data arrives at S1 the STB (stop bit) pin 1 at S1 goes low. This low sets IC-3A pin 5 low which enables the clock. The STB is also inverted by IC-5A and supplied to pin 11 of IC-1. Data is now latched on the front edge of the STB.

The clock going low will supply the ACK. On this edge IC-2 is loaded with the data now available from IC-1. When the clock returns High, IC-3A is clocked by IC-5C. Pin 6 goes High again, disabling the clock at IC-5D. The ACK is also over at this time. The step clock is provided at the output of IC-5B to one of the inputs of IC-6A and one of the inputs of IC-8A.

If there are no other STBs the logic stops until one is received.

The Y-limit and X-limit logic circuits are also located on this board 54. An open limit switch will prevent the machine from attempting to proceed beyond its physical limits.

The X-limit switch logic is provided by IC-6 and IC-7. An input pin at IC-7A is connected to the upper X-limit switch by way of an RC network used to keep the line free from interference. An input pin of IC-7C is connected to the lower X-limit switch. An RC network also keeps this line free from interference.

The Y-limit switch logic is provided by IC-8 and IC-9. An input pin at IC-9A is connected to the upper Y-limit switch by way of an RC network used to keep the line free from interference. An input pin at IC-9C is connected to the lower Y-limit switch. An RC network also keeps this line free from interference.

TABLE 1

| DATA | S1 PIN # | FUNCTION | IC-2 OUT |
|---|---|---|---|
| — | 1 | STB | — |
| 0 | 2 | X MOTOR STEP ENABLE | 2 |
| 1 | 3 | X MOTOR DIRECTION | 5 |
| 2 | 4 | Y MOTOR STEP ENABLE | 6 |
| 3 | 5 | Y MOTOR DIRECTION | 9 |
| 4 | 6 | PEN AND MOTOR ENABLE DATA | 12 |
| 5 | 7 | PEN CLOCK | 15 |
| 6 | 8 | MOTOR ENABLE CLOCK | 16 |
| 7 | 9 | UNUSED | 19 |
| — | 10 | ACK | — |
| — | 11-17 | UNUSED | — |
| — | 18-25 | GROUND | — |

The two bits controlling the X stepping motor are the X motor step enable bit and the X motor direction bit. See Table 1. They pass through IC-1 and IC-2. The X step enable bit will then appear at the input of IC-6A. If the bit is high then the step clock at IC-5B will appear at the output of IC-6A. From there it will proceed through IC-6B if the upper limit switch is not open. If it is open and if the direction bit is high, then the clock will not appear at the output of IC-6B. Once past IC-6B the clock arrives at IC-6C. If the lower X limit switch is open and if the direction bit is low, then the clock stops here. When the clock appears at the output of IC-6C it goes to the clock inputs of IC-14. This will shift the output of IC-14. The direction of shift will be determined by the direction bit from IC-2 at the input of IC-12A. IC-12 provides the "steering" for IC-14.

The output of IC-14, after passing through IC-16, "the X motor disable" (described later) is then delivered by way of 1k resistors 74 to S4 pins 3, 5, 7 and 9. From here the outputs travel to S6 pins 3, 5, 7 and 9 on the driver board 56. On the driver board 56 these outputs are used to turn on and off the Darlington power transistors 76 which drive both of the X motors, by way of S1 and S2.

The two bits controlling the Y stepping motor are the Y motor step enable bit and the Y motor direction bit. See Table 1. They pass through IC-1 and IC-2. The Y step enable bit will then appear at the input of IC-8A. If the bit is high then the step clock at IC-5B will appear at the output of IC-8A. From there it will proceed through IC-8B if the upper limit switch is not open. If it is open, and if the direction bit is high, then the clock will not appear at the output of IC-8B. Once past IC-8B the clock arrives at IC-8C. If the lower Y limit switch is open and if the direction bit is low, then the clock stops here. When the clock appears at the output of IC-8C it goes to the clock inputs of IC-14. This will shift the output of IC-14. The direction of shift will be determined by the direction bit from IC-2 at the input of IC-13A. IC-13 provides the "steering" for IC-15.

The output of IC-15, after passing through IC-17, "the Y motor disable" is then delivered by way of 1k resistors 78 to S4 pins 11, 13, 15 and 17. From here the outputs travel to S6 pins 11, 13, 15 and 17 on the driver board 56. On the driver board 56 these outputs are used to turn on and off the Darlington power transistors 80 which drive the Y motor, by way of S3.

The stepping motors 46 and 61 are disabled at power-up by pressing the reset button 72. This disabling of the stepping motors is accomplished with the help of the RC network tied to pin 13 of IC-10. This network forces pin 13 Low at power-up and allows it to go High shortly thereafter, assuring that pin 9 is Low. This Low is buffered by IC-6D and IC-8D. It then goes to one of the inputs of each AND gate of IC-16 and IC-17. Because these inputs are Low, all the outputs are Low. These Lows keep the Darlington power transistors 76, 77, 80 on the driver board 56 turned off, cutting all power to the motors.

It requires four bits of data to enable the motors 46 and 61 two bits in two consecutive bytes. See Table 1. First set the pen and motor enable data bit High with a Low on the motor enable clock bit. On the next byte set both of these bits High. This procedure places a High at pin 12 of IC-10, then clocks it with a High at pin 11, making pin 9 High. From here it goes through IC-6D and IC-8D and puts a High on one of the inputs of each AND gate in IC-16 and IC-17. These AND gates will now allow the outputs of IC-14 and IC-15 to reach the driver board 56.

Under software control four bits of data are also needed to disable the motors 46 and 61. First set both the pen and motor enable data bit and the motor enable clock Low. On the next byte set the pen and motor enable data bit Low and the motor enable clock High. This procedure place a Low at pin 12 of IC-10 then clocks it with a High at pin 11, making pin 9 Low. From here it goes through IC-6D and IC-8D and puts a Low on one of the inputs of each AND gate in IC-16 and IC-17. These AND gates will not allow the outputs of IC-14 and IC-15 to reach the driver board 56.

The pen 59 is lifted at power-up or by pressing the reset button with the same RC network used to disable the motors. This network, tied to pin 1 of IC-10, keeps pin 1 Low until after power-up is completed. It then goes High making sure that pin 6 is set High. This High goes through a 1k resistor 82, out S4 pin 23 to the driver board where a Darlington power transistor is turned on, energizing the pin drop coil 58 and lifting the pen 59.

Software control of the pen drop coil 58 is similar to controlling the motor disable ICs. It requires four bits of data, two bits in two consecutive bytes. See Table 1. To drop the pen 59, first set the pen and motor enable data bit High and the pen clock bit low. On the next byte make them both High. This procedure places a High on pin 2 of IC-10 then clocks it at pin 3. The result is to put a Low at pin 6. This Low will turn off the Darlington power transistor on the driver board that supplies current to the pen drop coil. When lifting the pen under software control a Low is needed on both the pen and motor enable data bit and on the pen clock. Then on the next byte keep the pen and motor enable data bit Low and make the pen clock High. This puts a Low on pin 2 and clocks it with a High at pin 3. Pin 6 is now High. This will turn on the Darlington power transistor that energizes the pen drop coil. When energized the coil will lift the pen.

FIG. 14 shows greater detail in the electrical circuitry of the plotter driver board 56 shown in FIG. 12.

The driver board 56 contains thirteen Darlington power transistors. The pen drop coil 58 uses one of these transistors 84 and each of the three motors uses four of the transistors. Spike suppression diodes are used to protect these transistors from spikes created by the motors 46 and 61 and pen drop coil 58. A 100 mfd capacitor 88 rated at 150 volts across the 6 volt motor supply line helps eliminate spikes. This board is also used as a jumper to connect the 12 volt fan to the 12 volt supply at S5 and to connect the Y limit switches to the clock and logic board 54. The Y limit switches plug into S4. Their information is carried back to the clock and logic board by way of a ribbon cable connected at S6.

The limit switches at 53 and 54 are momentary contact normally closed switches.

A D.C. powered fan is used to cool the driver board 56. It is on all the time the unit is on.

An A.C. powered fan is used to circulate the air in the main component compartment. It is switched on and off with the unit.

A 12 volt D.C. coil is used to lift the pen drop assembly.

The reset button 72 is a momentary contact, normally-open, push button switch that when pressed pulls an RC network on the clock and logic board Low. After releasing the button the RC network returns High. This High lifts the pen, resets the clock, and disables all the stepping motors. Pressing this button 72 also clears all memory in the buffer board.

The stepping motors 46 and 61 are 3 volt, 200 in. oz. motors with 200 steps per revolution, and an output shaft on each end.

The power supply is composed of three independent regulated supplies. A 6 volt 27 amp. supply to power the stepping motors, an 8 volt 1.5 amp. supply for the buffer board 52 and the clock 10 and logic board 54 and a 12 volt 1.5 amp. supply for the pen drop coil 58 and the 12 volt fan that cools the driver board 56.

Although the uses for the computerized marking system described thus far have been for marking patterns for square duct fittings, the system of the invention can also be used for marking patterns for round duct fittings.

Obviously, many modifications may be made without departing from the basic spirit of the present invention. Accordingly, it will be appreciated by those skilled in the art that within the scope of the appended claims, the invention may be practiced other than has been specifically described herein.

APPENDIX A

```
]LIST

1   REM   * SOFTWARE for CLS-100 *
2   REM   *                      *
3   REM   *          by          *
4   REM   *                      *
5   REM   *     Nile W. Daley    *
6   REM   *                      *
7   REM   *      MAIN MENU       *
8   REM   *                      *
9   REM   *     Version 1.01     *
10  HOME : VTAB 8
11  PRINT TAB( 13)"1 - BOXES"
12  PRINT
13  PRINT TAB( 13)"2 - ELBOWS"
14  PRINT
15  PRINT TAB( 13)"3 - OFFSETS"
16  PRINT
17  PRINT TAB( 13)"4 - NEW DISK"
18  PRINT
19  PRINT
20  PRINT TAB( 9): FLASH : PRINT "--- SELECT FITTING ---": NORMAL
21  NORMAL
22  HTAB 18: VTAB 22: INPUT "? ";X
23  IF X > 0 AND X < 5 THEN 25
24  GOTO 22
25  PRINT : HTAB 1: VTAB 18: CALL  - 958
26  VTAB 20: HTAB 16: PRINT "LOADING"
27  ON X GOTO 28,29,30,31
28  PRINT CHR$ (4);"RUN BOXES"
29  PRINT CHR$ (4);"RUN ELBOWS"
30  PRINT CHR$ (4);"RUN OFFSETS"
31  PRINT CHR$ (4);"RUN MENU"
```

APPENDIX B

```
]LIST

1   REM   * SOFTWARE for CLS-100 *
2   REM   *                      *
3   REM   *          by          *
4   REM   *                      *
5   REM   *     Nile W. Daley    *
6   REM   *                      *
7   REM   *       SET - UP       *
8   REM   *                      *
9   REM   *     Version 1.2      *
```

```
10  HOME
11  D$ = CHR$ (4)
12  ONERR GOTO 1
13  FLASH
14  VTAB 12: HTAB 10: PRINT "INSERT PROGRAM DISK"
15  VTAB 17: HTAB 9: PRINT "THEN PRESS (SPACE BAR)"
16  NORMAL
17  VTAB 20: HTAB 19
18  GET K$: IF ASC (K$) = 32 THEN 20
19  GOTO 18
20  VTAB 22: HTAB 12
21  PRINT D$"OPEN METAL-DATA"
22  PRINT D$"READ METAL-DATA"
23  INPUT GS$
24  INPUT OX
25  INPUT OY
26  INPUT MM
27  INPUT PF
28  INPUT PM
29  INPUT DE
30  INPUT DT
31  INPUT DB
32  INPUT SA
33  PRINT D$"CLOSE METAL-DATA"
34  HOME
35  VTAB 2: HTAB 12
36  PRINT "METAL-DATA FILE"
37  VTAB 5
38  PRINT "MEASUREMENTS ARE IN ";GS$
39  PRINT
40  PRINT "PITTSBURG FEMALE ....  ";PF
41  PRINT
42  PRINT "PITTSBURG MALE ......  ";PM
43  PRINT
44  PRINT "DRIVE EDGE ..........  ";DE
45  PRINT
46  PRINT "DRIVE EDGE TAPER ....  ";DT
47  PRINT
48  PRINT "BOX EDGE ............  ";DB
49  PRINT
50  PRINT "SPACE BETWEEN PARTS .  ";SA
51  YN$ = "N"
52  VTAB 22: HTAB 20: PRINT YN$
53  VTAB 20: HTAB 1
54  PRINT "DO YOU WANT TO CHANGE THE SET-UP (Y/N)"
55  VTAB 22: HTAB 18
56  INPUT "? ";YN$
57  IF YN$ = "1" OR YN$ = "Y" OR YN$ = "YES" THEN GOTO 59
58  PRINT D$;"RUN MENU"
59  HOME
60  HOME
61  PRINT "         METAL DATA SET-UP"
62  PRINT
63  PRINT "     ALL MEASURMENTS WILL BE IN"
64  PRINT
65  PRINT "    (1) INCHES  (2) CENTIMETERS"
66  PRINT
67  INPUT "                 ? ";GS$
68  PRINT
69  PRINT "    WHAT IS THE WIDTH OF YOUR ..."
70  PRINT
71  INPUT "PITTSBURG FEMALE ......? ";PF
72  INPUT "PITTSBURG MALE ........? ";PM
73  INPUT "DRIVE EDGE ............? ";DE
74  INPUT "DRIVE EDGE TAPER ......? ";DT
75  INPUT "BOX EDGE ..............? ";DB
76  INPUT "SPACE BETWEEN PARTS ...? ";SA
77  VTAB 20: HTAB 30: PRINT "N": VTAB 20: HTAB 1
78  INPUT "IS THE ABOVE CORRECT (Y/N) ? ";YN$
79  IF YN$ = "1" OR YN$ = "Y" OR YN$ = "YES" THEN 81
80  GOTO 59
81  IF GS$ = "1" THEN GS$ = "INCHES":MM = 33.88
82  IF GS$ = "2" THEN GS$ = "CENTIMETERS":MM = 13.33
```

```
83 OX = 3250:OY = 1625
84 D$ =  CHR$ (4)
85  PRINT D$"WRITE METAL-DATA"
86  PRINT GS$: PRINT OX: PRINT OY: PRINT MM: PRINT PF: PRINT PM: PRINT DE: PRINT
       DT: PRINT DB: PRINT SA
87  PRINT D$"CLOSE METAL-DATA"
88  GOTO 20
```

APPENDIX C

```
]LIST

1  REM  * SOFTWARE for CLS-100 *
2  REM  *                      *
3  REM  *          by          *
4  REM  *                      *
5  REM  *     Nile  W. Daley   *
6  REM  *                      *
7  REM  *  RADIUS ELBOW 0-90'  *
8  REM  *                      *
9  REM  *    Version - 1.3A    *
10  CLEAR
11  HOME
12 D$ =  CHR$ (4)
13  PRINT D$"OPEN METAL-DATA"
14  PRINT D$"READ METAL-DATA"
15  INPUT GS$
16  INPUT OX
17  INPUT OY
18  INPUT MM
19  INPUT PF
20  INPUT PM
21  INPUT DE
22  INPUT DT
23  INPUT DB
24  INPUT SA
25  PRINT D$"CLOSE METAL-DATA"
26 RM =  INT (MM + 1):UD = 0:PI = 3.14159266
27 FP = 1:LF = 0:Z = 128:RF = 0
28 XS = 0:YS = 0:R1 = 0:R2 = 0:XF = 0:YF = 0
29 SF = PI / 180
30  GOSUB 86
31  GOTO 226
32 SN = 0:SP = 0:MT = 0
33 MT = MT + 1
34  IF MT > LS THEN 44
35 SN = SN + SS
36  IF  INT (SN) >  INT (SP) THEN 40
37  IF UD = 1 THEN  PRINT  CHR$ (Z);
38  PRINT  CHR$ (PL);
39  GOTO 33
40 SP = SN
41  IF UD = 1 THEN  PRINT  CHR$ (Z);
42  PRINT  CHR$ (PS);
43  GOTO 33
44  RETURN
45 XL = XF - XS:YL = YF - YS
46 XP = (XL * MM) + R1:YP = (YL * MM) + R2
47 R1 =  ABS (XP) -  INT ( ABS (XP)):R2 =  ABS (YP) -  INT ( ABS (YP))
48  IF XP < 0 THEN R1 =  - R1
49  IF YP < 0 THEN R2 =  - R2
50 XS = XF:YS = YF
51  IF  ABS (XP) < 1 AND  ABS (YP) < 1 THEN 44
52  IF  ABS (XP) < 1 THEN 76
53  IF  ABS (YP) < 1 THEN 72
54  IF  INT ( ABS (XP)) =  INT ( ABS (YP)) THEN 80
55  IF  ABS (XP) -  ABS (YP) < 0 THEN 64
56 SS =  ABS (YP) /  ABS (XP):LS =  ABS (XP)
57 PL = X2:PS = Z2
58  IF YP > 0 THEN PS = Z1
59  IF XP < 0 THEN 61
60  GOTO 32
```

```
61 PL = X1:PS = Z3
62  IF YP > 0 THEN PS = Z4
63  GOTO 32
64 SS =  ABS (XP) /  ABS (YP):LS =  ABS (YP)
65 PL = Y1:PS = Z2
66  IF XP < 0 THEN PS = Z3
67  IF YP > 0 THEN 69
68  GOTO 32
69 PL = Y2:PS = Z1
70  IF XP < 0 THEN PS = Z4
71  GOTO 32
72 XD = X2
73  IF XP < 0 THEN XD = X1
74  FOR L = 1 TO  INT ( ABS (XP)): PRINT  CHR$ (XD);: NEXT L
75  RETURN
76 YD = Y2
77  IF YP < 0 THEN YD = Y1
78  FOR L = 1 TO  INT ( ABS (YP)): PRINT  CHR$ (YD);: NEXT L
79  RETURN
80  IF XP > 0 AND YP > 0 THEN ZL = Z1
81  IF XP > 0 AND YP < 0 THEN ZL = Z2
82  IF XP < 0 AND YP < 0 THEN ZL = Z3
83  IF XP < 0 AND YP > 0 THEN ZL = Z4
84  FOR L = 1 TO  INT ( ABS (XP)): PRINT  CHR$ (ZL);: NEXT L
85  RETURN
86 X1 = 1:X2 = 3:Y1 = 4:Y2 = 12:Z1 = 31:Z2 = 23:Z3 = 21:Z4 = 29
87  IF FP = 1 GOTO 89
88  X1 = 12:X2 = 4:Y1 = 1:Y2 = 3:Z1 = 23:Z2 = 21:Z3 = 29:Z4 = 31
89  RETURN
90 XF = 0:YF = 0:XS = 0:YS = 0:R1 = 0:R2 = 0
91  GOSUB 475: GOSUB 477: GOSUB 483
92 XF = PM + DT:YF = YS
93  GOSUB 45
94  GOSUB 480
95 XF = XS + CW - DT - DT:YF = YS
96  GOSUB 45
97 XF = XS + DT:YF = YS + DE
98  GOSUB 45
99 XF = XS + PM:YF = YS
100  GOSUB 45
101 XF = XS:YF = YS + TA - PO - DE
102  GOSUB 45
103 XF = XS - PM:YF = YS + PO
104  GOSUB 45
105 XF = XS + PM:YF = YS - PO
106  GOSUB 45
107 XF = XS +  COS (EA * SF) * (TB - PM - DE):YF = YS +  SIN (EA * SF) * (TB - PM - DE)
108  GOSUB 45
109 XF = XS +  COS ((EA + 90) * SF) * PM:YF = YS +  SIN ((EA + 90) * SF) * PM
110  GOSUB 45
111 XF = XS +  COS ((EA + AB) * SF) * DH:YF = YS +  SIN ((EA + AB) * SF) * DH
112  GOSUB 45
113 XF = XS +  COS ((EA + 90) * SF) * (CW - DT - DT):YF = YS +  SIN ((EA + 90) * SF) * (CW - DT - DT)
114  GOSUB 45
115 XF = XS +  COS ((EA + 90 + (90 - AB)) * SF) * DH:YF = YS +  SIN ((EA + 90 + (90 - AB)) * SF) * DH
116  GOSUB 45
117 XF = XS +  COS ((EA + 90) * SF) * PM:YF = YS +  SIN ((EA + 90) * SF) * PM
118  GOSUB 45
119 XF = XS +  COS ((EA + 180) * SF) * (TB - DE):YF = YS +  SIN ((EA + 180) * SF) * (TB - DE)
120  GOSUB 45
121  PRINT  CHR$ (Z);
122 AR = CW + PM:AS = 180 - AE
123 DS = 180 /  INT (AR * MM * PI):AN = AE / DS
124  FOR AL = 1 TO AN
125 AS = AS + DS:FS = AS * SF
126 XF =  COS (FS) * AR:YF =  SIN (FS) * AR
127 XF = XF + CW + PM:YF = YF + TA
128  GOSUB 45
```

```
129  NEXT AL
130  XF = XS:YF = TA
131   GOSUB 45
132  XF = XS:YF = DE
133   GOSUB 45
134  XF = PM:YF = DE
135   GOSUB 45
136  XF = XS + DT:YF = O
137   GOSUB 45
138   GOSUB 477
139  XF = O:YF = O
140   GOSUB 45
141   GOSUB 484
142   GOSUB 476
143   RETURN
144  XF = O:YF = O:XS = O:YS = O:R1 = O:R2 = O
145   GOSUB 475: GOSUB 477: GOSUB 483
146  XF = DE:YF = O
147   GOSUB 45
148   GOSUB 480
149  XF = XS + ((TA + TB + HR) - (DE + DE)):YF = YS
150   GOSUB 45
151  XF = XS:YF = PF
152   GOSUB 45
153  XF = XS + DE:YF = YS + DT
154   GOSUB 45
155  XF = XS:YF = YS + (HW - DT - DT)
156   GOSUB 45
157  XF = XS - DE:YF = YS + DT
158   GOSUB 45
159  XF = XS:YF = YS + PF
160   GOSUB 45
161  XF = XS - ((TA + TB + HR) - (DE + DE)):YF = YS
162   GOSUB 45
163  XF = XS:YF = YS - PF
164   GOSUB 45
165  XF = XS - DE:YF = YS - DT
166   GOSUB 45
167  XF = XS:YF = YS - (HW - DT - DT)
168   GOSUB 45
169  XF = XS + DE:YF = YS - DT
170   GOSUB 45
171  XF = XS:YF = YS - PF
172   GOSUB 45
173   GOSUB 477
174  XF = O:YF = O
175   GOSUB 45
176   GOSUB 484
177   GOSUB 476
178   RETURN
179  XF = O:YF = O:XS = O:YS = O:R1 = O:R2 = O
180   GOSUB 475: GOSUB 477: GOSUB 483
181  XF = DE:YF = O
182   GOSUB 45
183   GOSUB 480
184  XF = TA:YF = O
185   GOSUB 45
186  XF = XS:YF = PF
187   GOSUB 45
188  XF = XS:YF = O
189   GOSUB 45
190  XF = XS + TB - DE:YF = O
191   GOSUB 45
192  XF = XS:YF = PF
193   GOSUB 45
194  XF = XS + DE:YF = YS + DT
195   GOSUB 45
196  XF = XS:YF = YS + (HW - DT - DT)
197   GOSUB 45
198  XF = XS - DE:YF = YS + DT
199   GOSUB 45
200  XF = XS:YF = YS + PF
201   GOSUB 45
```

```
202 XF = XS - (TB - DE):YF = YS
203  GOSUB 45
204 XF = XS:YF = YS - PF
205  GOSUB 45
206 XF = XS:YF = YS + PF
207  GOSUB 45
208 XF = XS - (TA - DE):YF = YS
209  GOSUB 45
210 XF = XS:YF = YS - PF
211  GOSUB 45
212 XF = XS - DE:YF = YS - DT
213  GOSUB 45
214 XF = XS:YF = YS - (HW - DT - DT)
215  GOSUB 45
216 XF = XS + DE:YF = YS - DT
217  GOSUB 45
218 XF = XS:YF = YS - PF
219  GOSUB 45
220  GOSUB 477
221 XF = O:YF = 0
222  GOSUB 45
223  GOSUB 484
224  GOSUB 476
225  RETURN
226  HOME
227  PRINT  TAB( 12)"----------------"
228  PRINT  TAB( 11)"|  RADIUS ELBOW  |"
229  PRINT  TAB( 12)"----------------"
230  PRINT
231  VTAB 5: CALL  - 958
232  INPUT "WIDTH OF HEEL ..............? ";HW
233  IF HW < (DT + DT) THEN 293
234  IF HW * MM > OX THEN 288
235  HTAB 32: VTAB 5: CALL  - 958: PRINT HW
236  VTAB 6: CALL  - 958
237  INPUT "WIDTH OF CHEEK .............? ";CW
238  IF CW < (DT + DT) THEN 293
239  IF CW * MM > OX THEN 288
240  HTAB 32: VTAB 6: CALL  - 958: PRINT CW
241  VTAB 7: CALL  - 958
242  INPUT "THROAT #1 ..................? ";TA
243  IF TA < DE THEN 293
244  IF TA * MM > OX THEN 288
245  HTAB 32: VTAB 7: CALL  - 958: PRINT TA
246  VTAB 8: CALL  - 958
247  INPUT "THROAT #2 ..................? ";TB
248  IF TB < DE THEN 293
249  IF TB * MM > OX THEN 288
250  HTAB 32: VTAB 8: CALL  - 958: PRINT TB
251  VTAB 9: CALL  - 958
252  INPUT "ANGLE OF ELBOW ( 0-90 ) .....? ";AE
253  IF AE < 0 THEN 293
254  IF AE > 90 THEN 288
255  HTAB 32: VTAB 9: CALL  - 958: PRINT AE
256 YN$ = "Y"
257  VTAB 11: HTAB 30: PRINT YN$: VTAB 11: HTAB 1
258  INPUT "IS THE ABOVE CORRECT (Y/N) ? ";YN$
259  IF YN$ = "2" OR YN$ = "N" OR YN$ = "NO" THEN 226
260 TC = TA: IF TA < TB THEN TA = TB:TB = TC
261 PO =  SIN ((AE / 2) * SF) * PM
262 DH =  SQR (DE ^ 2 + DT ^ 2)
263  IF DT < .001 THEN AA = 90: GOTO 265
264 AA =  ATN (DE / DT) / SF
265 AB = 90 - AA
266 EA = 90 - AE
267 HR = CW * (AE * SF)
268 TX =  COS (EA * SF) * TB
269  IF TX < PM THEN TX = PM
270 TY =  SIN (EA * SF) * TB
271 TY = TY +  SIN ((EA + 90) * SF) * (CW + PM)
272 A1 = PM + CW + TX:A6 =  INT ((A1 * 1000) + .999) / 1000
273 A2 = TA + TY:A7 =  INT ((A2 * 1000) + .999) / 1000
274 B1 = TA + TB + HR:B6 =  INT ((B1 * 1000) + .999) / 1000
```

```
275 B2 = PF + HW + PF:B7 =  INT ((B1 * 1000) + .999) / 1000
276 C1 = TA + TB:C6 =  INT ((C1 * 1000) + .999) / 1000
277 C2 = B2:C7 = B7
278  IF A1 * MM > OX OR A2 * MM > OX THEN 283
279  IF A1 * MM > OY AND A2 * MM > OY THEN 283
280  IF B1 * MM > OX OR B2 * MM > OX THEN 283
281  IF B1 * MM > OY AND B2 * MM > OY THEN 283
282  GOTO 298
283  HTAB 1: VTAB 14: CALL  - 958
284  HTAB 8: FLASH : PRINT "THIS FITTING IS TOO LARGE": NORMAL
285  VTAB 18: HTAB 26:YN$ = "Y": PRINT YN$
286  VTAB 18: HTAB 1
287  GOTO 416
288  HTAB 1: VTAB 14: CALL  - 958
289  HTAB 9: FLASH : PRINT "THIS INPUT IS TOO LARGE": NORMAL
290  VTAB 18: HTAB 26:YN$ = "Y": PRINT YN$
291  VTAB 18: HTAB 1
292  GOTO 416
293  HTAB 1: VTAB 14: CALL  - 958
294  HTAB 9: FLASH : PRINT "THIS INPUT IS TOO SMALL": NORMAL
295  VTAB 18: HTAB 26:YN$ = "Y": PRINT YN$
296  VTAB 18: HTAB 1
297  GOTO 416
298  HTAB 1: VTAB 10: CALL  - 958
299  PRINT
300  PRINT   TAB( 9)"PIECES OF METAL NEEDED"
301  PRINT
302  IF A1 < A2 THEN  PRINT  TAB( 5)"CHEEK #1 - ";A7;" X ";A6:AF = 2: GOTO 304
303  PRINT  TAB( 5)"CHEEK #1 - ";A6;" X ";A7:AF = 1
304  IF A1 < A2 THEN  PRINT  TAB( 5)"CHEEK #2 - ";A7;" X ";A6:DF = 2: GTO 306
305  PRINT  TAB( 5)"CHEEK #2 - ";A6;" X ";A7:DF = 1
306  IF B1 < B2 THEN  PRINT  TAB( 5)"HEEL ....- ";B7;" X ";B6:BF = 2: GTO 308
307  PRINT  TAB( 5)"HEEL ....- ";B6;" X ";B7:BF = 1
308  IF C1 < C2 THEN  PRINT  TAB( 5)"THROAT ..- ";C7;" X ";C6:CF = 2: GOTO 324
309  PRINT  TAB( 5)"THROAT ..- ";C6;" X ";C7:CF = 1
310  GOTO 324
311  IF X3 * MM < OY THEN  RETURN
312  PRINT "PIECE TOO LARGE - ROTATION NOT POSSIBLE"
313  HTAB 16: VTAB 20
314  IF P = 1 THEN  PRINT "CHEEK #1"
315  IF P = 2 THEN  PRINT "CHEEK #2"
316  IF P = 3 THEN  PRINT "HEEL"
317  IF P = 4 THEN  PRINT "THROAT"
318  PRINT
319  PRINT "     PRESS SPACE BAR TO CONTINUE"
320  HTAB 19: VTAB 23
321  GET K$: IF  ASC (K$) = 32 THEN 323
322  GOTO 321
323 TL = 2: RETURN
324 YN$ = "N"
325  VTAB 18: HTAB 1: CALL  - 958: VTAB 18: HTAB 29: PRINT YN$: VTAB 18: HTAB 1

326  IF AF = 1 THEN FP = 1:X3 = A1:Y3 = A2
327  IF AF = 2 THEN FP = 2:X3 = A2:Y3 = A1
328 P = 1:TL = 1: GOSUB 311
329  IF TL = 2 THEN 341
330  INPUT "ROTATE CHEEK #1 90' (Y/N) ? ";YN$
331  IF YN$ = "1" OR YN$ = "Y" OR YN$ = "YES" THEN 333
332  GOTO 341
333  IF AF = 1 THEN 336
334 AF = 1
335  GOTO 337
336 AF = 2
337  HTAB 5: VTAB 13: CALL  - 868
338  IF AF = 1 THEN  PRINT "CHEEK #1 - ";A6;" X ";A7:FP = 1:X3 = A1:Y3 = A2
339  IF AF = 2 THEN  PRINT "CHEEK #1 - ";A7;" X ";A6:FP = 2:X3 = A2:Y3 = A1
340  GOTO 324
341  PRINT :P = 1:RF = FP:FP = 1
342  GOSUB 86: GOTO 419
343  GOSUB 475: GOSUB 483: GOSUB 45
344 FP = RF: GOSUB 86: GOSUB 90
345 YN$ = "N"
346  VTAB 18: HTAB 1: CALL  - 958: VTAB 18: HTAB 29: PRINT YN$: VTAB 18: HTAB 1
```

```
347  IF DF = 1 THEN FP = 1:X3 = A1:Y3 = A2
348  IF DF = 2 THEN FP = 2:X3 = A2:Y3 = A1
349 P = 2:TL = 1: GOSUB 311
350  IF TL = 2 THEN 362
351  INPUT "ROTATE CHEEK #2 90' (Y/N) ? ";YN$
352  IF YN$ = "1" OR YN$ = "Y" OR YN$ = "YES" THEN 354
353  GOTO 362
354  IF DF = 1 THEN 357
355 DF = 1
356  GOTO 358
357 DF = 2
358  HTAB 5: VTAB 14: CALL  - 868
359  IF DF = 1 THEN  PRINT "CHEEK #2 - ";A6;" X ";A7:FP = 1:X3 = A1:Y3 = A2
360  IF DF = 2 THEN  PRINT "CHEEK #2 - ";A7;" X ";A6:FP = 2:X3 = A2:Y3 = A1
361  GOTO 345
362  PRINT :P = 2:RF = FP:FP = 1
363  GOSUB 86: GOTO 419
364  GOSUB 475: GOSUB 483: GOSUB 45
365 FP = RF: GOSUB 86: GOSUB 90
366 YN$ = "N"
367  VTAB 18: HTAB 1: CALL  - 958: VTAB 18: HTAB 29: PRINT YN$: VTAB 18: HTAB 1

368  IF BF = 1 THEN FP = 1:X3 = B1:Y3 = B2
369  IF BF = 2 THEN FP = 2:X3 = B2:Y3 = B1
370 P = 3:TL = 1: GOSUB 311
371  IF TL = 2 THEN 384
372 YN$ = "N"
373  INPUT "ROTATE HEEL ....90' (Y/N) ? ";YN$
374  IF YN$ = "1" OR YN$ = "Y" OR YN$ = "YES" THEN 376
375  GOTO 384
376  IF BF = 1 THEN 379
377 BF = 1
378  GOTO 380
379 BF = 2
380  HTAB 5: VTAB 15: CALL  - 868
381  IF BF = 1 THEN  PRINT "HEEL ....- ";B6;" X ";B7:FP = 1:X3 = B1:Y3 = B2
382  IF BF = 2 THEN  PRINT "HEEL ....- ";B7;" X ";B6:FP = 2:X3 = B2:Y3 = B1
383  GOTO 366
384 P = 3:RF = FP:FP = 1
385  GOSUB 86: GOTO 419
386  GOSUB 475: GOSUB 483: GOSUB 45
387 FP = RF: GOSUB 86: GOSUB 144
388 YN$ = "N"
389  VTAB 18: HTAB 1: CALL  - 958: VTAB 18: HTAB 29: PRINT YN$: VTAB 18: HTAB 1

390  IF CF = 1 THEN FP = 1:X3 = B1:Y3 = B2
391  IF CF = 2 THEN FP = 2:X3 = B2:Y3 = B1
392 P = 4:TL = 1: GOSUB 311
393  IF TL = 2 THEN 405
394  INPUT "ROTATE THROAT ..90' (Y/N) ? ";YN$
395  IF YN$ = "1" OR YN$ = "Y" OR YN$ = "YES" THEN 397
396  GOTO 405
397  IF CF = 1 THEN 400
398 CF = 1
399  GOTO 401
400 CF = 2
401  HTAB 5: VTAB 16: CALL  - 868
402  IF CF = 1 THEN  PRINT "THROAT ..- ";C6;" X ";C7:FP = 1:X3 = C1:Y3 = C2
403  IF CF = 2 THEN  PRINT "THROAT ..- ";C7;" X ";C6:FP = 2:X3 = C2:Y3 = C1
404  GOTO 388
405  PRINT :P = 4:RF = FP:FP = 1
406  GOSUB 86: GOTO 419
407  GOSUB 475: GOSUB 483: GOSUB 45
408 FP = RF: GOSUB 86: GOSUB 179
409 YN$ = "Y"
410  VTAB 18: HTAB 1: CALL  - 958: VTAB 18: HTAB 38: PRINT YN$: VTAB 18: HTAB 1

411  INPUT "DRAW ANOTHER ELBOW THIS SIZE (Y/N) ? ";YN$
412  IF YN$ = "2" OR YN$ = "N" OR YN$ = "NO" THEN YN$ = "N": VTAB 18: HTAB 38: PRINT
     YN$: GOTO 414
413  GOTO 253
414 YN$ = "Y"
```

```
415 VTAB 21: HTAB 26: PRINT YN$: VTAB 21: HTAB 1
416 INPUT "DRAW A NEW ELBOW (Y/N) ? ";YN$
417 IF YN$ = "2" OR YN$ = "N" OR YN$ = "NO" THEN  PRINT D$;"RUN MENU"
418 GOTO 226
419 HTAB 1: VTAB 18: CALL  - 958
420 IF LF = 0 THEN 454
421 PRINT "  PLACEMENT IN RELATION TO LAST PIECE"
422 PRINT
423 PRINT "  1-ABOVE   2-BELOW   3-RIGHT   4-LEFT"
424 PRINT "           5-MANUAL        6-SKIP"
425 VTAB 22: HTAB 19: CALL  - 958
426 INPUT "? ";ND$
427 ND =  VAL (ND$)
428 IF ND < 1 OR ND > 6 THEN 419
429 HTAB 19: VTAB 22: CALL  - 958: PRINT ND
430 IF ND < 6 THEN 432
431 ON P GOTO 345,366,388,409
432 VTAB 18: HTAB 1: CALL  - 958
433 IF ND = 5 THEN 463
434 IF LF = 1 THEN 444
435 IF RF = 2 THEN 440
436 IF ND = 1 THEN XF = 0:YF = SA: GOTO 453
437 IF ND = 2 THEN XF = 0:YF =  - Y4 - SA - Y3: GOTO 453
438 IF ND = 3 THEN XF = X4 + SA:YF =  - Y4: GOTO 453
439 IF ND = 4 THEN XF =  - SA - X3:YF =  - Y4: GOTO 453
440 IF ND = 1 THEN XF = 0:YF = SA + Y3: GOTO 453
441 IF ND = 2 THEN XF = 0:YF =  - Y4 - SA: GOTO 453
442 IF ND = 3 THEN XF = X4 + SA:YF =  - Y4 + Y3: GOTO 453
443 IF ND = 4 THEN XF =  - SA - X3:YF =  - Y4 + Y3: GOTO 453
444 IF RF = 2 THEN 449
445 IF ND = 1 THEN XF = 0:YF = Y4 + SA: GOTO 453
446 IF ND = 2 THEN XF = 0:YF =  - SA - Y3: GOTO 453
447 IF ND = 3 THEN XF = X4 + SA:YF = 0: GOTO 453
448 IF ND = 4 THEN XF =  - SA - X3:YF = 0: GOTO 453
449 IF ND = 1 THEN XF = 0:YF = Y4 + SA + Y3: GOTO 453
450 IF ND = 2 THEN XF = 0:YF =  - SA: GOTO 453
451 IF ND = 3 THEN XF = X4 + SA:YF = Y3: GOTO 453
452 IF ND = 4 THEN XF =  - SA - X3:YF = Y3: GOTO 453
453 LF = RF:X4 = X3:Y4 = Y3: GOTO 466
454 HTAB 28: VTAB 18:YN$ = "N": PRINT YN$
455 HTAB 12: VTAB 18
456 IF P = 1 THEN  PRINT "SKIP CHEEK #1 ? "
457 IF P = 2 THEN  PRINT "SKIP CHEEK #2 ? "
458 IF P = 3 THEN  PRINT "SKIP HEEL ...? "
459 IF P = 4 THEN  PRINT "SKIP HROAT ..? "
460 HTAB 28: VTAB 18: INPUT "";YN$
461 IF YN$ = "1" OR YN$ = "Y" OR YN$ = "YES" THEN YN$ = "Y"
462 IF YN$ = "Y" THEN  ON P GOTO 345,366,388,409
463 HTAB 6: VTAB 20: PRINT "PLACE PEN ON LOWER LEFT CORNER": PRINT
464 XF = 0:YF = 0:LF = RF:X4 = X3:Y4 = Y3:XS = 0:YS = 0
465 IF RF = 2 THEN XF = 0:YF = Y3:X4 = X3:Y4 = Y3
466 PRINT "   PRESS (SPACE BAR) TO START DRAWING"
467 HTAB 19: VTAB 23
468 GET K$: IF  ASC (K$) = 32 THEN 470
469 GOTO 468
470 HTAB 1: VTAB 18: CALL  - 958: HTAB 11: VTAB 20
471 IF P = 1 THEN  PRINT "COMPUTING CHEEK #1": GOTO 343
472 IF P = 2 THEN  PRINT "COMPUTING CHEEK #2": GOTO 364
473 IF P = 3 THEN  PRINT "COMPUTING HEEL #1": GOTO 386
474 IF P = 4 THEN  PRINT "COMPUTING HEEL #2": GOTO 407
475 PR# 1: PRINT  CHR$ (9);"ON";: RETURN
476 PR# 0: RETURN
477 FOR PD = 1 TO 15: PRINT  CHR$ (Z);: NEXT PD
478 PRINT  CHR$ (Z); CHR$ (32);
479 FOR PD = 1 TO 15: PRINT  CHR$ (Z);: NEXT PD:UD = 0: RETURN
480 FOR PD = 1 TO 15: PRINT  CHR$ (Z);: NEXT PD
481 PRINT  CHR$ (16); CHR$ (48);
482 FOR PD = 1 TO 15: PRINT  CHR$ (Z);: NEXT PD:UD = 1: RETURN
483 PRINT  CHR$ (16); CHR$ (80);: RETURN
484 PRINT  CHR$ (Z); CHR$ (64);: RETURN
```

APPENDIX D

]LIST

```
1  REM  * SOFTWARE for CLS-100 *
2  REM  *                       *
3  REM  *          by           *
4  REM  *                       *
5  REM  *    Nile  W. Daley     *
6  REM  *                       *
7  REM  *       OFFSETS         *
8  REM  *                       *
9  REM  *      Version - 1.3    *
10 CLEAR
11 HOME
12 D$ =  CHR$ (4)
13  PRINT D$"OPEN METAL-DATA"
14  PRINT D$"READ METAL-DATA"
15  INPUT GS$
16  INPUT OX
17  INPUT OY
18  INPUT MM
19  INPUT PF
20  INPUT PM
21  INPUT DE
22  INPUT DT
23  INPUT DB
24  INPUT SA
25  PRINT D$"CLOSE METAL-DATA"
26 RM =  INT (MM + 1):UD = 0:PI = 3.14159266
27 FP = 1:LF = 0:Z = 128:RF = 0
28 SF = PI / 180
29  GOSUB 84
30  GOTO 182
31 SN = 0:SP = 0:MT = 0
32 MT = MT + 1
33  IF MT > LS THEN 43
34 SN = SN + SS
35  IF  INT (SN) >  INT (SP) THEN 39
36  IF UD = 1 THEN  PRINT  CHR$ (Z);
37  PRINT  CHR$ (PL);
38  GOTO 32
39 SP = SN
40  IF UD = 1 THEN  PRINT  CHR$ (Z);
41  PRINT  CHR$ (PS);
42  GOTO 32
43  RETURN
44 XP = (XL * MM) + R1:YP = (YL * MM) + R2
45 R1 =  ABS (XP) -  INT ( ABS (XP)):R2 =  ABS (YP) -  INT ( ABS (YP))
46  IF XP < 0 THEN R1 =  - R1
47  IF YP < 0 THEN R2 =  - R2
48 XS = XF:YS = YF
49  IF  ABS (XP) < 1 AND  ABS (YP) < 1 THEN 43
50  IF  ABS (XP) < 1 THEN 74
51  IF  ABS (YP) < 1 THEN 70
52  IF  INT ( ABS (XP)) =  INT ( ABS (YP)) THEN 78
53  IF  ABS (XP) -  ABS (YP) < 0 THEN 62
54 SS =  ABS (YP) /  ABS (XP):LS =  ABS (XP)
55 PL = X2:PS = Z2
56  IF YP > 0 THEN PS = Z1
57  IF XP < 0 THEN 59
58  GOTO 31
59 PL = X1:PS = Z3
60  IF YP > 0 THEN PS = Z4
61  GOTO 31
62 SS =  ABS (XP) /  ABS (YP):LS =  ABS (YP)
63 PL = Y1:PS = Z2
64  IF XP < 0 THEN PS = Z3
65  IF YP > 0 THEN 67
66  GOTO 31
67 PL = Y2:PS = Z1
68  IF XP < 0 THEN PS = Z4
```

```
69  GOTO 31
70  XD = X2
71  IF XP < 0 THEN XD = X1
72  FOR L = 1 TO INT ( ABS (XP)): PRINT  CHR$ (XD);: NEXT L
73  RETURN
74  YD = Y2
75  IF YP < 0 THEN YD = Y1
76  FOR L = 1 TO INT ( ABS (YP)): PRINT  CHR$ (YD);: NEXT L
77  RETURN
78  IF XP > 0 AND YP > 0 THEN ZL = Z1
79  IF XP > 0 AND YP < 0 THEN ZL = Z2
80  IF XP < 0 AND YP < 0 THEN ZL = Z3
81  IF XP < 0 AND YP > 0 THEN ZL = Z4
82  FOR L = 1 TO INT ( ABS (XP)): PRINT  CHR$ (ZL);: NEXT L
83  RETURN
84  X1 = 1:X2 = 3:Y1 = 4:Y2 = 12:Z1 = 31:Z2 = 23:Z3 = 21:Z4 = 29
85  IF FP = 1 GOTO 87
86  X1 = 12:X2 = 4:Y1 = 1:Y2 = 3:Z1 = 23:Z2 = 21:Z3 = 29:Z4 = 31
87  RETURN
88  GOSUB 439: GOSUB 441: GOSUB 447
89  XL = BX:YL = 0
90   GOSUB 44
91  XL = 0:YL = BY
92   GOSUB 44
93   GOSUB 444
94  XL = LL:YL = 0
95   GOSUB 44
96  AR = CW + PM:AS = 270
97   PRINT  CHR$ (Z);
98  DS = 180 /  INT (AR * MM * PI):AN = AE / DS
99  XS = 0:YS =  - AR
100  FOR AL = 1 TO AN
101  AS = AS + DS:FS = AS * SF
102  XF =  COS (FS) * AR:YF =  SIN (FS) * AR
103  XL = XF - XS:YL = YF - YS
104  GOSUB 44
105   PRINT  CHR$ (Z);
106  XS = XF:YS = YF
107   NEXT AL
108  XL =  COS ((AE + 90) * SF) * PM:YL =  SIN ((AE + 90) * SF) * PM
109   GOSUB 44
110  XL =  COS ((AE + 90 - DA) * SF) * DH:YL =  SIN ((AE + 90 - DA) * SF) * DH
111   GOSUB 44
112  XL =  COS ((AE + 90) * SF) * (CW - DT - DT):YL =  SIN ((AE + 90) * SF) * (C
     W - DT - DT)
113   GOSUB 44
114  XL =  COS ((AE + 90 + DA) * SF) * DH:YL =  SIN ((AE + 90 + DA) * SF) * DH
115   GOSUB 44
116  XL = 0:YL = PM
117   GOSUB 44
118  XL =  - LL:YL = 0
119   GOSUB 44
120  AR = CW + PM:AS = 90
121   PRINT  CHR$ (Z);
122  DS = 180 /  INT (AR * MM * PI):AN = AE / DS
123  XS = 0:YS = AR
124  FOR AL = 1 TO AN
125  AS = AS + DS:FS = AS * SF
126  XF =  COS (FS) * AR:YF =  SIN (FS) * AR
127  XL = XF - XS:YL = YF - YS
128   GOSUB 44
129   PRINT  CHR$ (Z);
130  XS = XF:YS = YF
131   NEXT AL
132  XL =  COS ((AE + 270) * SF) * PM:YL =  SIN ((AE + 270) * SF) * PM
133   GOSUB 44
134  XL =  COS ((AE + 270 - DA) * SF) * DH:YL =  SIN ((AE + 270 - DA) * SF) * DH
135   GOSUB 44
136  XL =  COS ((AE + 270) * SF) * (CW - DT - DT):YL =  SIN ((AE + 270) * SF) *
     (CW - DT - DT)
137   GOSUB 44
138  XL =  COS ((AE + 270 + DA) * SF) * DH:YL =  SIN ((AE + 270 + DA) * SF) * DH
```

```
139  GOSUB 44
140 XL = 0:YL =  - PM
141  GOSUB 44
142  GOSUB 441
143 XL = 0:YL =  - BY
144  GOSUB 44
145 XL =  - BX:YL = 0
146  GOSUB 44
147  GOSUB 441: GOSUB 448: GOSUB 440
148  RETURN
149  GOSUB 439: GOSUB 447: GOSUB 441
150 XL = DE:YL = 0
151  GOSUB 44
152  GOSUB 444
153 XL = LL + HR + HR:YL = 0
154  GOSUB 44
155 XL = 0:YL = PF
156  GOSUB 44
157 XL = DE:YL = DT
158  GOSUB 44
159 XL = 0:YL = HW - (DT + DT)
160  GOSUB 44
161 XL =  - DE:YL = DT
162  GOSUB 44
163 XL = 0:YL = PF
164  GOSUB 44
165 XL =  - LL - HR - HR:YL = 0
166  GOSUB 44
167 XL = 0:YL =  - PF
168  GOSUB 44
169 XL =  - DE:YL =  - DT
170  GOSUB 44
171 XL = 0:YL =  - HW + (DT + DT)
172  GOSUB 44
173 XL = DE:YL =  - DT
174  GOSUB 44
175 XL = 0:YL =  - PF
176  GOSUB 44
177  GOSUB 441
178 XL =  - DE:YL = 0
179  GOSUB 44
180  GOSUB 441: GOSUB 448: GOSUB 440
181  RETURN
182  HOME
183  PRINT  TAB( 13)"----------------"
184  PRINT  TAB( 12)"|    OFFSETS    |"
185  PRINT  TAB( 13)"----------------"
186  PRINT
187  VTAB 5: CALL  - 958
188  INPUT "WIDTH OF HEEL ................? ";HW
189  IF HW < (DT + DT) THEN 257
190  IF HW * MM > OX THEN 252
191  HTAB 32: VTAB 5: CALL  - 958: PRINT HW
192  VTAB 6: CALL  - 958
193  INPUT "WIDTH OF CHEEK ..............? ";CW
194  IF CW < (DT + DT) THEN 257
195  IF CW * MM > OX THEN 252
196  HTAB 32: VTAB 6: CALL  - 958: PRINT CW
197  VTAB 7: CALL  - 958
198  INPUT "LENGHT ......................? ";LO
199 OL = LO - DE - DE
200  IF OL < CW OR OL = CW THEN 257
201  IF OL * MM > OX THEN 252
202  HTAB 32: VTAB 7: CALL  - 958: PRINT LO
203  VTAB 8: CALL  - 958
204  INPUT "OFFSET ......................? ";O
205  IF O < O THEN 257
206  IF O * MM > OX THEN 252
207  HTAB 32: VTAB 8: CALL  - 958: PRINT O
208  VTAB 9: CALL  - 958
209 YN$ = "Y"
210  VTAB 11: HTAB 30: PRINT YN$: VTAB 11: HTAB 1
211  INPUT "IS THE ABOVE CORRECT (Y/N) ? ";YN$
```

```
212  IF YN$ = "2" OR YN$ = "N" OR YN$ = "NO" THEN 182
213  XX = O - CW:YY = OL
214   IF XX = O THEN AE = 90:HB = YY: GOTO 218
215   IF XX < O THEN AE =  ATN (YY / XX) / SF + 180
216   IF XX > O THEN AE =  ATN (YY / XX) / SF
217  HB =  SQR (XX ^ 2 + YY ^ 2)
218  LL =  SQR (HB ^ 2 - CW ^ 2)
219  EA = AE - ( ATN (CW / LL) / SF)
220  AE = 90 - EA
221  EA = 90 - AE
222  DH =  SQR (DE ^ 2 + DT ^ 2)
223   IF DT < .001 THEN AD = 90: GOTO 225
224  DA =  ATN (DE / DT) / SF
225  AD = 90 - DA
226  HR = CW * (AE * SF)
227  EX =  COS ((90 + AE) * SF) * (CW + PM)
228  EY =  SIN ((90 + AE) * SF) * (CW + PM)
229  FX = EX +  COS ((270 + AE) * SF) * PM
230  FY = EY +  SIN ((270 + AE) * SF) * PM
231  GX = FX +  COS ((AE + 270 - DA) * SF) * DH
232  GY = FY +  SIN ((AE + 270 - DA) * SF) * DH
233  HY = GY +  SIN ((AE + 270) * SF) * (CW - DT - DT)
234  BY = O
235   IF HY <  - PM THEN BY =  ABS (HY + PM)
236  BX =  ABS (EX)
237   IF GX < EX THEN BX =  ABS (GX)
238  A1 = BX + BX + LL:A6 =  INT ((A1 * 1000) + .999) / 1000
239  A2 = BY + BY + PM + PM + CW:A7 =  INT ((A2 * 1000) + .999) / 1000
240  B1 = LL + HR + HR + DE + DE:B6 =  INT ((B1 * 1000) + .999) / 1000
241  B2 = HW + PF + PF:B7 =  INT ((B2 * 1000) + .999) / 1000
242   IF A1 * MM > OX OR A2 * MM > OX THEN 247
243   IF A1 * MM > OY AND A2 * MM > OY THEN 247
244   IF B1 * MM > OX OR B2 * MM > OX THEN 247
245   IF B1 * MM > OY AND B2 * MM > OY THEN 247
246  GOTO 262
247  HTAB 1: VTAB 14: CALL  - 958
248  HTAB 8: FLASH : PRINT "THIS FITTING IS TOO LARGE": NORMAL
249  VTAB 18: HTAB 27:YN$ = "Y": PRINT YN$
250  VTAB 18: HTAB 1
251  GOTO 380
252  HTAB 1: VTAB 14: CALL  - 958
253  HTAB 9: FLASH : PRINT "THIS INPUT IS TOO LARGE": NORMAL
254  VTAB 18: HTAB 27:YN$ = "Y": PRINT YN$
255  VTAB 18: HTAB 1
256  GOTO 380
257  HTAB 1: VTAB 14: CALL  - 958
258  HTAB 9: FLASH : PRINT "THIS INPUT IS TOO SMALL": NORMAL
259  VTAB 18: HTAB 27:YN$ = "Y": PRINT YN$
260  VTAB 18: HTAB 1
261  GOTO 380
262  HTAB 1: VTAB 10: CALL  - 958
263  PRINT
264  PRINT  TAB( 9)"PIECES OF METAL NEEDED"
265  PRINT
266   IF A1 < A2 THEN  PRINT  TAB( 5)"CHEEK #1 - ";A7;" X ";A6:AF = 2: GOTO 268
267  PRINT  TAB( 5)"CHEEK #1 - ";A6;" X ";A7:AF = 1
268   IF A1 < A2 THEN  PRINT  TAB( 5)"CHEEK #2 - ";A7;" X ";A6:DF = 2: GOTO 270
269  PRINT  TAB( 5)"CHEEK #2 - ";A6;" X ";A7:DF = 1
270   IF B1 < B2 THEN  PRINT  TAB( 5)"HEEL #1..- ";B7;" X ";B6:BF = 2: GOTO 272
271  PRINT  TAB( 5)"HEEL #1..- ";B6;" X ";B7:BF = 1
272   IF B1 < B2 THEN  PRINT  TAB( 5)"HEEL #2..- ";B7;" X ";B6:BF = 2: GOTO 288
273  PRINT  TAB( 5)"HEEL #2..- ";B6;" X ";B7:BF = 1
274  GOTO 288
275   IF X3 * MM < OY THEN  RETURN
276  PRINT "PIECE TOO LARGE - ROTATION NOT POSSIBLE"
277  HTAB 16: VTAB 20
278   IF P = 1 THEN  PRINT "CHEEK #1"
279   IF P = 2 THEN  PRINT "CHEEK #2"
280   IF P = 3 THEN  PRINT "HEEL  #1"
281   IF P = 4 THEN  PRINT "HEEL  #2"
282  PRINT
283  PRINT "      PRESS SPACE BAR TO CONTINUE"
284  HTAB 19: VTAB 23
```

```
285  GET K$: IF  ASC (K$) = 32 THEN 287
286  GOTO 285
287 TL = 2: RETURN
288 YN$ = "N"
289  VTAB 18: HTAB 1: CALL  - 958: VTAB 18: HTAB 29: PRINT YN$: VTAB 18: HTAB 1

290  IF AF = 1 THEN FP = 1:X3 = A1:Y3 = A2
291  IF AF = 2 THEN FP = 2:X3 = A2:Y3 = A1
292 P = 1:TL = 1: GOSUB 275
293  IF TL = 2 THEN 305
294  INPUT "ROTATE CHEEK #1 90' (Y/N) ? ";YN$
295  IF YN$ = "1" OR YN$ = "Y" OR YN$ = "YES" THEN 297
296  GOTO 305
297  IF AF = 1 THEN 300
298 AF = 1
299  GOTO 301
300 AF = 2
301  HTAB 5: VTAB 13: CALL  - 868
302  IF AF = 1 THEN  PRINT "CHEEK #1 - ";A6;" X ";A7:FP = 1:X3 = A1:Y3 = A2
303  IF AF = 2 THEN  PRINT "CHEEK #1 - ";A7;" X ";A6:FP = 2:X3 = A2:Y3 = A1
304  GOTO 288
305  PRINT :P = 1:RF = FP:FP = 1
306  GOSUB 84: GOTO 383
307  GOSUB 439: GOSUB 447: GOSUB 44
308 FP = RF: GOSUB 84: GOSUB 88
309 YN$ = "N"
310  VTAB 18: HTAB 1: CALL  - 958: VTAB 18: HTAB 29: PRINT YN$: VTAB 18: HTAB 1

311  IF DF = 1 THEN FP = 1:X3 = A1:Y3 = A2
312  IF DF = 2 THEN FP = 2:X3 = A2:Y3 = A1
313 P = 2:TL = 1: GOSUB 275
314  IF TL = 2 THEN 326
315  INPUT "ROTATE CHEEK #2 90' (Y/N) ? ";YN$
316  IF YN$ = "1" OR YN$ = "Y" OR YN$ = "YES" THEN 318
317  GOTO 326
318  IF DF = 1 THEN 321
319 DF = 1
320  GOTO 322
321 DF = 2
322  HTAB 5: VTAB 14: CALL  - 868
323  IF DF = 1 THEN  PRINT "CHEEK #2 - ";A6;" X ";A7:FP = 1:X3 = A1:Y3 = A2
324  IF DF = 2 THEN  PRINT "CHEEK #2 - ";A7;" X ";A6:FP = 2:X3 = A2:Y3 = A1
325  GOTO 309
326  PRINT :P = 2:RF = FP:FP = 1
327  GOSUB 84: GOTO 383
328  GOSUB 439: GOSUB 447: GOSUB 44
329 FP = RF: GOSUB 84: GOSUB 88
330 YN$ = "N"
331  VTAB 18: HTAB 1: CALL  - 958: VTAB 18: HTAB 29: PRINT YN$: VTAB 18: HTAB 1

332  IF BF = 1 THEN FP = 1:X3 = B1:Y3 = B2
333  IF BF = 2 THEN FP = 2:X3 = B2:Y3 = B1
334 P = 3:TL = 1: GOSUB 275
335  IF TL = 2 THEN 348
336 YN$ = "N"
337  INPUT "ROTATE HEEL #1..90' (Y/N) ? ";YN$
338  IF YN$ = "1" OR YN$ = "Y" OR YN$ = "YES" THEN 340
339  GOTO 348
340  IF BF = 1 THEN 343
341 BF = 1
342  GOTO 344
343 BF = 2
344  HTAB 5: VTAB 15: CALL  - 868
345  IF BF = 1 THEN  PRINT "HEEL #1..- ";B6;" X ";B7:FP = 1:X3 = B1:Y3 = B2
346  IF BF = 2 THEN  PRINT "HEEL #1..- ";B7;" X ";B6:FP = 2:X3 = B2:Y3 = B1
347  GOTO 330
348 P = 3:RF = FP:FP = 1
349  GOSUB 84: GOTO 383
350  GOSUB 439: GOSUB 447: GOSUB 44
351 FP = RF: GOSUB 84: GOSUB 149
352 YN$ = "N"
353  VTAB 18: HTAB 1: CALL  - 958: VTAB 18: HTAB 29: PRINT YN$: VTAB 18: HTAB 1
```

```
354  IF CF = 1 THEN FP = 1:X3 = B1:Y3 = B2
355  IF CF = 2 THEN FP = 2:X3 = B2:Y3 = B1
356  P = 4:TL = 1: GOSUB 275
357  IF TL = 2 THEN 369
358  INPUT "ROTATE HEEL #2..90' (Y/N) ? ";YN$
359  IF YN$ = "1" OR YN$ = "Y" OR YN$ = "YES" THEN 361
360  GOTO 369
361  IF CF = 1 THEN 364
362 CF = 1
363  GOTO 365
364 CF = 2
365  HTAB 5: VTAB 16: CALL  - 868
366  IF CF = 1 THEN  PRINT "HEEL #2..- ";B6;" X ";B7:FP = 1:X3 = B1:Y3 = B2
367  IF CF = 2 THEN  PRINT "HEEL #2..- ";B7;" X ";B6:FP = 2:X3 = B2:Y3 = B1
368  GOTO 352
369  PRINT :P = 4:RF = FP:FP = 1
370  GOSUB 84: GOTO 383
371  GOSUB 439: GOSUB 447: GOSUB 44
372  FP = RF: GOSUB 84: GOSUB 149
373  YN$ = "Y"
374  VTAB 18: HTAB 1: CALL  - 958: VTAB 18: HTAB 39: PRINT YN$: VTAB 18: HTAB 1
375  INPUT "DRAW ANOTHER OFFSET THIS SIZE (Y/N) ? ";YN$
376  IF YN$ = "2" OR YN$ = "N" OR YN$ = "NO" THEN YN$ = "N": VTAB 18: HTAB 39: PRINT YN$: GOTO 378
377  GOTO 208
378 YN$ = "Y"
379  VTAB 21: HTAB 27: PRINT YN$: VTAB 21: HTAB 1
380  INPUT "DRAW A NEW OFFSET (Y/N) ? ";YN$
381  IF YN$ = "2" OR YN$ = "N" OR YN$ = "NO" THEN  PRINT D$;"RUN MENU"
382  GOTO 182
383  HTAB 1: VTAB 18: CALL  - 958
384  IF LF = 0 THEN 418
385  PRINT "  PLACEMENT IN RELATION TO LAST PIECE"
386  PRINT
387  PRINT "   1-ABOVE   2-BELOW   3-RIGHT   4-LEFT"
388  PRINT "         5-MANUAL        6-SKIP"
389  VTAB 22: HTAB 19: CALL  - 958
390  INPUT "? ";ND$
391 ND =  VAL (ND$)
392  IF ND < 1 OR ND > 6 THEN 383
393  HTAB 19: VTAB 22: CALL  - 958: PRINT ND
394  IF ND < 6 THEN 396
395  ON P GOTO 309,330,352,373
396  VTAB 18: HTAB 1: CALL  - 958
397  IF ND = 5 THEN 427
398  IF LF = 1 THEN 408
399  IF RF = 2 THEN 404
400  IF ND = 1 THEN XF = 0:YF = SA: GOTO 417
401  IF ND = 2 THEN XF = 0:YF =  - Y4 - SA - Y3: GOTO 417
402  IF ND = 3 THEN XF = X4 + SA:YF =  - Y4: GOTO 417
403  IF ND = 4 THEN XF =  - SA - X3:YF =  - Y4: GOTO 417
404  IF ND = 1 THEN XF = 0:YF = SA + Y3: GOTO 417
405  IF ND = 2 THEN XF = 0:YF =  - Y4 - SA: GOTO 417
406  IF ND = 3 THEN XF = X4 + SA:YF =  - Y4 + Y3: GOTO 417
407  IF ND = 4 THEN XF =  - SA - X3:YF =  - Y4 + Y3: GOTO 417
408  IF RF = 2 THEN 413
409  IF ND = 1 THEN XF = 0:YF = Y4 + SA: GOTO 417
410  IF ND = 2 THEN XF = 0:YF =  - SA - Y3: GOTO 417
411  IF ND = 3 THEN XF = X4 + SA:YF = 0: GOTO 417
412  IF ND = 4 THEN XF =  - SA - X3:YF = 0: GOTO 417
413  IF ND = 1 THEN XF = 0:YF = Y4 + SA + Y3: GOTO 417
414  IF ND = 2 THEN XF = 0:YF =  - SA: GOTO 417
415  IF ND = 3 THEN XF = X4 + SA:YF = Y3: GOTO 417
416  IF ND = 4 THEN XF =  - SA - X3:YF = Y3: GOTO 417
417 LF = RF:X4 = X3:Y4 = Y3:XL = XF:YL = YF: GOTO 430
418  HTAB 28: VTAB 18:YN$ = "N": PRINT YN$
419  HTAB 12: VTAB 18
420  IF P = 1 THEN  PRINT "SKIP CHEEK #1 ? "
421  IF P = 2 THEN  PRINT "SKIP CHEEK #2 ? "
422  IF P = 3 THEN  PRINT "SKIP HEEL #1 ? "
423  IF P = 4 THEN  PRINT "SKIP HEEL #2 ? "
```

```
424  HTAB 28: VTAB 18: INPUT "";YN$
425  IF YN$ = "1" OR YN$ = "Y" OR YN$ = "YES" THEN YN$ = "Y"
426  IF YN$ = "Y" THEN  ON P GOTO 309,330,352,373
427  HTAB 6: VTAB 20: PRINT "PLACE PEN ON LOWER LEFT CORNER": PRINT
428  XL = 0:YL = 0:LF = RF:X4 = X3:Y4 = Y3
429  IF RF = 2 THEN XL = 0:YL = Y3:X4 = X3:Y4 = Y3
430  PRINT "   PRESS (SPACE BAR) TO START DRAWING"
431  HTAB 19: VTAB 23
432  GET K$: IF  ASC (K$) = 32 THEN 434
433  GOTO 432
434  HTAB 1: VTAB 18: CALL  - 958: HTAB 11: VTAB 20
435  IF P = 1 THEN  PRINT "COMPUTING CHEEK #1": GOTO 307
436  IF P = 2 THEN  PRINT "COMPUTING CHEEK #2": GOTO 328
437  IF P = 3 THEN  PRINT "COMPUTING HEEL #1": GOTO 350
438  IF P = 4 THEN  PRINT "COMPUTING HEEL #2": GOTO 371
439  PR# 1: PRINT  CHR$ (9);"ON";: RETURN
440  PR# 0: RETURN
441  FOR PD = 1 TO 15: PRINT  CHR$ (Z);: NEXT PD
442  PRINT  CHR$ (Z); CHR$ (32);
443  FOR PD = 1 TO 15: PRINT  CHR$ (Z);: NEXT PD:UD = 0: RETURN
444  FOR PD = 1 TO 15: PRINT  CHR$ (Z);: NEXT PD
445  PRINT  CHR$ (16); CHR$ (48);
446  FOR PD = 1 TO 15: PRINT  CHR$ (Z);: NEXT PD:UD = 1: RETURN
447  PRINT  CHR$ (16); CHR$ (80);: RETURN
448  PRINT  CHR$ (Z); CHR$ (64);: RETURN
```

What is claimed is:

1. A transportable computerized system for designing and marking patterns for pieces of a sheet metal fitting on a metal sheet of standard size or a scrap metal sheet, said system comprising:

computer means including a user-controlled input device, internal memory means, processor means, monitor means, and output means, said user-controlled input device for inputting data representing parameters in a pattern design for the sheet metal pieces to be marked on the metal sheet;

interface means connected to said computer output means, computer-controlled X-Y plotter means connected to said interface means, said plotter including a surface for receiving the metal sheet and including a marking means for marking the patterns on the metal sheet; and a computer program processed by said computer means, wherein, said program includes coded instructions for generating a menu on said monitor means from which selections are inputted by the user in real-time using said user-controlled input device, said program includes coded instructions for computing patterns for a plurality of fittings in real-time, said program includes coded instructions for permitting the user to select the fitting to be computed in real-time, said program includes coded instructions for utilizing the inputted data representing parameters in the pattern design to be marked on the metal sheet and for utilizing the coded instructions for computing patterns for a user-selected fitting in real-time, and said program includes coded instructions for controlling the operation of said computer-controlled X-Y plotter in real-time.

2. The computerized sheet metal design and pattern making system described in claim 1, wherein said computer program further includes coded instructions for asking the user to input parameters with respect to an edge folding device for facilitating assembly of two dimensional cut pieces into a three dimensional fitting and input parameters with respect to a drive edge device for connecting plural fittings.

3. The computerized sheet metal design and pattern making system described in claim 1, wherein said computer program includes coded instructions for computing patterns for boxes for plenums, elbows, transitions and offsets.

4. The computerized sheet metal design and pattern making system described in claim 1, wherein said computer program includes coded instructions for computing elbows in the range of 0-90 angular degrees.

5. The computerized sheet metal design and pattern making system described in claim 1, wherein said computer program includes coded instructions for computing square throat radius elbows.

6. The computerized sheet metal design and pattern making system described in claim 1, wherein said user-controlled input device is a keyboard.

7. The computerized sheet metal design and pattern making system described in claim 1, wherein said entire system is transportable in an automotive vehicle so that it can be transported and used at a job site.

8. The computerized sheet metal design and pattern making system described in claim 1, wherein said marking means includes a felt tip pen.

9. The computerized sheet metal design and pattern making system described in claim 1, wherein said X-Y plotter includes means for raising and lowering said marking means.

10. The computerized sheet metal design and pattern making system described in claim 9, wherein said means for raising and lowering said marking means is a solenoid means.

11. A computerized system for designing and marking patterns for pieces of a sheet metal fitting on a metal sheet, said system comprising:

computer means including a user-controlled input device, internal memory means, processor means, monitor means, and output means, said user-controlled input device for inputting data representing parameters in a pattern design for the sheet metal pieces to be marked on the metal sheet;

interface means connected to said computer output means, said interface means including, buffer means connected to said computer means, said buffer means storing digital information from said computer means until the digital information is needed by a clock and logic means, clock and logic means connected to said buffer means, said clock and logic means accepting the digital information from said buffer means for controlling plotter driver means, plotter driver means connected to said clock and logic means, said driver means for driving an X-Y plotter means under control of said clock and logic means, a menu on said monitor means from which selections are inputted by the user using said user-controlled input device;

a computer program processed by said computer means, wherein, said program includes coded instructions for computing patterns for a plurality of fittings in real-time, said program includes coded instructions for permitting the user to select the fitting to be computed in real-time, said program includes coded instructions for utilizing the inputted data representing parameters in the pattern design to be marked on the metal sheet and for utilizing the coded instructions for computing patterns for a user-selected fitting in real-time, and said program includes coded instructions for controlling the operation of said computer-controlled X-Y plotter in real-time.

12. A computerized system for designing and marking patterns for pieces of a sheet metal fitting on a metal sheet, said system comprising:

computer means including a user-controlled input device, internal memory means, processor means, monitor means, and output means, said user-controlled input device for inputting data representing parameters in pattern design for the sheet metal pieces to be marked on the metal sheet;

interface means connected to said computer output means;

computer-controlled X-Y plotter means connected to said interface means, said plotter includes a surface for receiving the metal sheet and includes a marking means for marking the patterns on the metal sheet;

a computer program processed by said computer means, wherein, said program includes coded instructions for generating a menu on said monitor means from which selections are inputted by the user using said user-controlled input device, said program includes coded instructions for computing patterns for a plurality of fittings including boxes for plenums, elbows, transitions, and offsets, said program includes coded instructions for setting up parameters relating to interlocking edges of the pieces, said program includes coded instructions for setting up parameters relating to selection of feet-inch units or metric units, said program includes coded instructions for permitting the user to select the fitting to be computed, said program includes coded instructions for utilizing the inputted data representing parameters in the pattern design to be marked on the metal sheet and for utilizing the coded instructions for computing patterns for a user-selected fitting, and said program includes coded instructions for controlling the operation of said computer-controlled X-Y plotter in real-time.

13. A computerized system for designing and marking patterns for pieces of a sheet metal fitting on a metal sheet, said system comprising:

computer means including a user-controlled input device, internal memory means, microprocessor means, monitor means, and output means, said user-controlled input device for inputting data representing parameters in a pattern design for the sheet metal pieces to be marked on the metal sheet;

interface means connected to said computer output means, computer-controlled X-Y plotter means connected to said interface means;

said plotter means including, surface means for receiving a metal sheet, marking means for marking computer generated patterns on the metal sheet, said marking means including pen means for marking the patterns of the metal sheet and including pen control means for controlling said pen means, said pen control means including, an X direction drive motor and a Y direction drive motor controlled by said interface means, and carriage means for carrying said pen means, said carriage means including first carriage means for moving said pen means along an X direction and second carriage means for moving said pen means along a Y direction, said first carriage means riding along first rail means oriented in the X direction, said second carriage means riding along second rail means oriented in the Y direction, a computer program processed by said computer means, wherein, said program includes coded instructions for generating a menu on said monitor means from which selections are inputted by the user using said user-controlled input device, said program includes coded instructions for computing patterns for a plurality of fittings, said program includes coded instructions for permitting the user to select the fitting to be computed, said program includes coded instructions for utilizing the inputted data representing parameters in the pattern design to be marked on the metal sheet and for utilizing the coded instructions for computing patterns for a user-selected fitting, and said program includes coded instructions for controlling the operation of said computer-controlled X-Y plotter in real-time.

14. The computerized system for designing and marking patterns for sheet metal as described in claim 13 wherein said second carriage means ride along second rail means located on said first carriage means.

15. The computerized system for designing and marking patterns for sheet metal as described in claim 14 wherein said second carriage means ride along said second rail means by means of rack and pinion gearing.

16. The computerized system for designing and marking patterns for sheet metal as described in claim 14 wherein said second rail means are in the form of two parallel rails.

17. The computerized system for designing and marking patterns for sheet metal as described in claim 13 wherein said first rail means are in the form of two parallel rails.

18. The computerized system for designing and marking patterns for sheet metal as described in claim 13 wherein said first carriage means are moved along said first rail means by rack and pinion means.

19. A computerized system for designing and marking patterns for pieces of a sheet metal fitting on a metal sheet, said system comprising:

computer means including a user-controlled input device, internal memory means, microprocessor means, monitor means, and output means, said user-controlled input device for inputting data representing parameters in a pattern design for the sheet metal pieces to be marked on the metal pieces to be marked on the metal sheet, interface means connected to said computer output means, said interface means including, buffer means connected to said computer means, said buffer means storing digital information from said computer means until the digital information is needed by a clock and logic means, clock and logic means connected to said buffer means, said clock and logic means accepting the digital information from said buffer means for controlling plotter driver means, plotter driver means connected to said clock and logic means, said driver means for driving an X-Y plotter means under control of said clock and logic means, computer-controlled X-Y plotter means connected to said interface means, said plotter includes a surface for receiving the metal sheet and includes a marking means for marking the patterns on the metal sheet, a computer program processed by said computer means, wherein, said program includes coded instructions for generating a menu on said monitor means from which selections are inputted by the user using said user-controlled input device, said program includes coded instructions for computing patterns for a plurality of fittings including boxes, plenums, elbows, transitions, and jumps, said program includes coded instructions for setting up parameters relating to interlocking edges of the pieces, said program includes coded instructions for setting up parameters relating to selection of feet-inch units or metric units, said program includes coded instructions for permitting the user to select the fitting to be computed, said program includes coded instructions for utilizing the inputted data representing parameters in the pattern design to be marked on the metal sheet and for utilizing the coded instructions for computing patterns for a user-selected fitting, and said program includes coded instructions for controlling the operation of said computer-controlled X-Y plotter in real-time.

20. A transportable computerized system for real-time designing and marking patterns for pieces of a sheet metal fitting on a metal sheet of standard size or a scrap metal sheet, said system comprising:

computer means including a user-controlled input device, internal memory means, processor means, monitor means, and output means, said user-controlled input device for inputting data representing parameters in a pattern design for the sheet metal pieces to be marked on the metal sheet, interface means connected to said computer output means;

computer-controlled X-Y plotter means connected to said computer output means, said plotter including a surface for receiving the metal sheet and including a marking means for marking the patterns on the metal sheet, said receiving surface including magnet means for securing the metal sheet to the surface, said plotter means including a hand-crank for manually moving said marking means to a selected location on said metal sheet, said marking means including a manually operated, spring-biased pen point that can be lowered for manual marking of the metal sheet, a computer program processed by said computer means, wherein, said program includes coded instructions for generating a menu in real-time on said monitor means from which selections are inputted by the user using said user-controlled input device in, said program includes coded instructions for computing patterns for a plurality of fittings in real-time, said program includes coded instructions for permitting the user to select the fitting to be computed in real-time, said program includes coded instructions for utilizing the inputted data representing parameters in the pattern design to be marked on the metal sheet and for utilizing the coded instructions for computing patterns for a user-selected fitting in real-time, and said program includes coded instructions for controlling the operation of said computer-controlled X-Y plotter in real-time.

* * * * *